(12) United States Patent
McGregor

(10) Patent No.: US 7,150,499 B2
(45) Date of Patent: Dec. 19, 2006

(54) COLLAPSIBLE COVER FOR SEATING UNIT

(75) Inventor: Rob Roy McGregor, Toronto (CA)

(73) Assignee: 6134548 Canada Inc., Toronto (CA)

( * ) Notice: Subject to any disclaimer, the term of this patent is extended or adjusted under 35 U.S.C. 154(b) by 0 days.

(21) Appl. No.: 11/152,152

(22) Filed: Jun. 15, 2005

(65) Prior Publication Data

US 2005/0275257 A1    Dec. 15, 2005

Related U.S. Application Data

(60) Provisional application No. 60/579,260, filed on Jun. 15, 2004.

(51) Int. Cl.
*A47C 7/62* (2006.01)
(52) U.S. Cl. .............................. 297/184.13; 297/184.15
(58) Field of Classification Search ........... 297/184.11, 297/184.13, 184.15
See application file for complete search history.

(56) References Cited

U.S. PATENT DOCUMENTS

| | | |
|---|---|---|
| 1,339,527 A | 5/1920 | Sperling et al. |
| 1,412,935 A | 4/1922 | Greenebaum |
| 3,227,484 A | 1/1966 | Merclean |
| 3,675,667 A | 7/1972 | Miller |
| 3,917,302 A | 11/1975 | Gebhard |
| 3,960,161 A | 6/1976 | Norman |
| 4,533,170 A | 8/1985 | Banks et al. |
| 4,582,355 A | 4/1986 | Hall |
| 4,978,166 A * | 12/1990 | James .................. 297/184.17 |
| 5,074,616 A | 12/1991 | Smith |
| 5,104,134 A | 4/1992 | Cone |
| 5,116,273 A | 5/1992 | Chan |
| 5,137,044 A | 8/1992 | Brady |
| 5,168,889 A | 12/1992 | Diestel |
| 5,184,865 A | 2/1993 | Mohtasham et al. |
| 5,277,148 A | 1/1994 | Rossignol et al. |
| 5,411,315 A | 5/1995 | Greenwood |
| 5,522,639 A | 6/1996 | Jaime |

(Continued)

FOREIGN PATENT DOCUMENTS

GB    2 329 156    3/1999

(Continued)

*Primary Examiner*—Milton Nelson, Jr.

(57) ABSTRACT

The present invention is directed to a collapsible cover for protecting an occupant in a seating unit having a head region and a foot region. The cover has a body comprised of a flexible material having a top portion and at least one side wall portion, the top portion having a generally ellipse shape and having a length to span the distance between the head region and foot region of the seating unit and a width to span the width of the seating unit. The sidewall portion is connected to the top portion along a substantial portion of the periphery of the top portion to provide an arched configuration to the top portion. The cover further has a single closed loop frame member made of a flexible, coilable, resilient material, that is secured along the length of the structure's membrane body so as to assume an ellipse-like shape when viewed from above, that is bent into an arched configuration about its minor axis. The closed loop frame member is movable between an extended orientation to allow the cover to be attached to the seating unit and a collapsed orientation to allow for a reduced size of the cover for transport and storage and is connected to the periphery of the top portion to provide in the extended orientation an arched ellipse shape about the length of the top portion. The cover also has a means for releasably attaching the cover to a seating unit.

13 Claims, 32 Drawing Sheets

U.S. PATENT DOCUMENTS

| | | | |
|---|---|---|---|
| 5,542,732 A | 8/1996 | Pollman |
| 5,730,490 A | 3/1998 | Mortenson |
| 5,975,558 A | 11/1999 | Sittu |
| 5,975,613 A | 11/1999 | Sippel |
| 6,012,756 A | 1/2000 | Clark-Dickson |
| 6,039,393 A | 3/2000 | Roh |
| 6,068,322 A | 5/2000 | Kuester |
| 6,109,282 A | 8/2000 | Yoon |
| 6,155,628 A | 12/2000 | Williams |
| 6,217,099 B1 | 4/2001 | McKinney et al. |
| 6,224,073 B1 | 5/2001 | Au |
| 6,513,827 B1 | 2/2003 | Barenbrug |
| 6,517,153 B1 | 2/2003 | Brewer |
| 6,527,294 B1 | 3/2003 | Brewington et al. |
| D481,976 S | 11/2003 | Everett |
| D486,098 S | 2/2004 | Church |
| D486,099 S | 2/2004 | Chen |
| 6,851,136 B1 | 2/2005 | Brereton |

FOREIGN PATENT DOCUMENTS

| | | |
|---|---|---|
| GB | 2 349 566 | 11/2000 |

* cited by examiner

COLLAPSIBLE COVER FOR SEATING UNIT

CROSS REFERENCE TO RELATED APPLICATIONS

This application is a continuation of Ser. No. 60/579,260 filed Jun. 15, 2004.

FIELD OF THE INVENTION

The present invention relates to accessories for seating devices. More specifically, it relates to a protective cover that is multi-purpose, and easily deploys and collapses for use on a variety of seating devices.

BACKGROUND OF THE INVENTION

For many years manufacturers have addressed the need for protective enclosures for seating devices that protect the occupant from hazards such as sun, wind, rain, snow, cold, blowing sand, insects, contact by strangers, saliva aerosol, cold, moderate and tropical climates, and the like. Protective covers have been designed to provide for a total encapsulation of the occupant, while considering the importance of ventilation, that the cover can be interchangeably affixed to a variety of seating device types and models, that the cover be easily removed, that it installs and removes quickly, that it be compactly stowed away, and that it be affordably constructed.

A wide variety of seating devices require protective covers that protect from afore mentioned hazards.

For example, children and adults who are indisposed to walking are frequently transported in mobile carriages from one location to another. A wide variety of mobile carriages such as wheel chairs are employed. Children are transported in strollers, which come in a wide variety of configurations such as, for example, a jogger type stroller of U.S. Pat. No. D481,976 to Everett, a four wheeled stroller of U.S. Pat. No. D486,098, or an umbrella stroller of U.S. Pat. No. 3,917,302 to Gebhard, double strollers such as that of Pat. No. D486,099 to Chen, or tandem stroller per U.S. Pat. No. 6,527,294 to Brewington et al.

In another example, infants are routinely transported in infant seats, baskets or wheeled infant seats of various forms from one location to another. A wide variety of seats are employed. Vehicle seats, generically referred to as car seats have been adapted for use in automobiles, on strollers, or to be carried by hand. These seats can also double as stationary seating for the infant. Shopping carts are frequently equipped with permanently affixed infant seats that resemble car seats but do not have handles. Infants are also frequently placed in bouncy chairs, specially designed infant swings, glide swings and the like for entertainment and in order allow the relatively immobile infant to have a view and to be in view of an adult. As infants have changing needs during transit or when stationary, they are frequently removed and replaced from the seat by the caregiver.

Many further examples of mobile and stationary seating devices exist such as the bouncy chair of U.S. Pat. No. 5,411,315, an infant seat mounted to shopping cart, infant swing device, or wheeled infant seat per U.S. Pat. No. 6,513,827, or U.S. Pat. No. 5,104,134. Other seating devices to which this invention has applicability will become apparent to those of skill in the art.

Dedicated covers to protect occupants of seating devices are well known. One such cover is shown in U.S. Pat. No. 1,339,527 to Sperling et. al. which describes a collapsible screen for baby carriages which has side flaps and is rolled for storage. This screen requires that the carriage have a particular frame for mounting and is therefore not universal.

U.S. Pat. No. 1,412,935 to GreeneBaum shows a baby carriage screen as foot and head portions that are attached to the handle in the middle of the carriage.

U.S. Pat. No. 3,227,484 to Merclean describes a rain protective cover that uses an elasticized strap to fasten to a stroller, and an overhead canopy frame for ceiling support.

U.S. Pat. No. 4,533,170 to Banks et al. discloses a self-supporting frame for a stroller or similar infant conveyance device comprised of collapsible poles that can be compacted lengthwise. Although this design does not require a canopy for ceiling support, it has limited collapsibility, as its spring rod members are normally straight and rigid, thereby requiring them to be forced into a coiled shape.

U.S. Pat. No. 4,582,355 to Hall describes a weather guard for a carriage or stroller which is made of an impervious clear plastic material and which relies upon a pre-existing canopy structure for maintaining a ceiling.

U.S. Pat. No. 5,168,889 to Diestel discloses an overhead canopied cover for a wheel chair that relies upon a tubular frame that is disassembled when not in use.

U.S. Pat. No. 5,184,865 to Mohtasham et al. describes collapsible insect netting that is either comprised of a retractable cover, which utilizes a circular rib bearing unit to pivot out of the way, or is comprised of resilient spring rods in an arched configuration that require disassembly for storage. Rain protection is not disclosed.

U.S. Pat. No. 5,542,732 to Pollman discloses a supplementary shade for a canopied stroller. Apart from not covering the legs of the stroller occupant, this shade does not disclose rain or insect protection.

U.S. Pat. No. 5,522,639 to Jaime discloses an infant carrier seat having dual sun visors mounted at the foot and head that stow away in compartments that are built into the foot and head of the seat. While this design allows for unobtrusive positioning of the sun visors, the sun visors disclosed are not intended for interchangeability with incompatible or dissimilar seats.

U.S. Pat. No. 5,730,490 to Mortenson shows a protective cover for an infant car seat, which keeps the ceiling of the cover away from the infant by attaching it to the handle with straps. This cover can only be used on infant carrier seats that come with handles. In addition, this cover cannot be used when the handle is stowed for transport in an automobile, which is a normal requirement for fastening car seats with rotating handles into automobiles.

U.S. Pat. No. 5,975,558 to Sittu illustrates an adjustable shade to be used with a stroller having an integral canopy. Apart from not coving the legs of the stroller occupant, this shade does not disclose rain or insect protection.

U.S. Pat. No. 5,975,613 to Sippel illustrates a sunshade for a stroller which covers the occupant completely and which relies upon a rectangular canopy that is permanently pivotally attached to the stroller. Two layers of shade cloth, one being a mesh and the other being a cotton material that is not transparent, achieve shading. No rain or insect protection is disclosed.

U.S. Pat. No. 6,012,756 to Clark-Dickson discloses a shade cover to be used with a hooded pram or stroller to protect from UV radiation. No rain or insect protection is disclosed.

U.S. Pat. No. 6,039,393 to Roh depicts a protective cover for an infant carrier seat that keeps the ceiling away from the occupant either by means of a resilient U shaped self-supporting element that is sewn into the cover ceiling and laterally mounted at the approximate midpoint of the length of the carrier, or by means of a cover support attachment that is affixed to the infant seat-carrying handle. The limitation of affixing the ceiling to the carrying handle has been discussed above. The U shaped element enables the cover to be interchangeably affixed to infant carriers with or without handles while keeping the ceiling away from the occupant. As a result of lifting the ceiling away from the occupant, it is disclosed that side section (length wise) ventilation is provided when an opaque inclement weather hood with a base hood width is used. However, as the geometry of the U shaped supporting element defines the greatest cross sectional area, forming a semi-circle, in the width-wise direction only, the effect is that the length-wise side section ventilation is constrained by the limited side section surface area afforded by the U shaped support element geometry. In addition, the small side section surface area that results from the geometry of this cover reduces the overall volume of space available to the occupant, which has the potential of causing distress to the infant due to feelings of confinement.

It is also disclosed in U.S. Pat. No. 6,039,393 to Roh that by removing the elasticized skirt from the perimeter of the seat the occupant can be accessed. A means of accessing the infant without removing the cover skirt from the perimeter of the seat is not disclosed. In practice, this technique of accessing the infant is impractical when one considers that removing the elastic from one edge removes tension from the entire cover perimeter seal, which has the effect of collapsing the ceiling, thereby requiring complete removal or temporary stowing of the cover so that it can be out of the way for access to the infant. Furthermore, as the cover must be replaced every time it is needed, the adult is not only required to strap the infant into the seat, but to 'fuss' with affixing the perimeter of the cover and keeping the ceiling away from the occupant while trying to secure the unit.

U.S. Pat. No. 6,068,322 to Kuester discloses a cover for a baby buggy, which is intended to protect an infant from air pollution and is comprised of a non-air permeable fabric to enable maintenance of positive pressure by a fan unit, which provides all necessary ventilation to the occupant. Arched stays are employed to provide ceiling support of the canopy, which must be disassembled when stowing away. Although good for extremes of pollution, this design relies primarily upon self-powered mechanical ventilation rather than natural ventilation. Rain and insect protection is not disclosed.

U.S. Pat. No. 3,960,161 to Norman describes a saddle-shaped geometry of a collapsible tent that is held stable by securing the tent to the ground with ties. Another embodiment is in a "potato chip" shape and is described as a novelty of child toy that is also unstable in the form disclosed without the use of ties.

U.S. Pat. No. 6,109,282 to Yoon provides for a self erecting and self supporting tent comprised of a flexible sheet like material, side panels, and a resilient closed loop frame member with an hour glass shape such that this structure, when erected, is stable without the use of ground ties or a floor due to connection of the opposing rounded lower edges to the body ends. This method of maintaining the arched configuration, although feasible for a tent is not amenable to other applications in which the side panel lower edges must remain flexible for attachment to seating devices. The method of collapsing is by twisting the tent into a figure eight shape and folding to a compact form, repeating this process as necessary depending upon the size of the cover. This twisting procedure for collapsing results in the collapsed tent fabric being turned inside out, resulting in a tangled collapsed tent that is often time consuming to disentangle and deploy during the self erecting process. An hourglass-shaped ceiling is disclosed as the means of stabilizing the tent in place of ties. This hourglass shaped tent is not particularly amenable to applications where the ceiling surface area needs to be maximized at the mid span, nor is it necessary in situations where self-support is not required.

U.S. Pat. No. 6,155,628 illustrates a flexible cloth-like sunshade for a jogger type stroller that is designed primarily for overhead shading, and does not protect from sun ingress at the side of the stroller as it is not encapsulating, nor is this design suitable for strollers that are not tricycle type due to the nature of the mounting bracket disclosed. Rain and insect protection is also not disclosed.

U.S. Pat. No. 6,217,099 to McKinney et al. discloses a multi-layered protective shield for a stroller that overcomes the need for an overhead canopy by means of an inflatable frame support member. Although it does disclose that the inflatable frame members' rigidity will be sufficiently rigid to support the weight of the protective layers when inflated, resistance to say, tampering by the occupant, or strong winds is not explicitly addressed. This design also omits the applicability of this cover to jogger type strollers, and to the practicality of installation that requires inflation and attachment of the inflated member to the stroller.

U.S. Pat. No. 6,224,073 to Au discloses a collapsible windscreen comprised of two side panels reinforced by resilient loop material covered in flexible material extended across each loop member. These side panels mount to the sides of a pram or stroller by means of strapping such as Velcro™. A flap of material joins these two loops to form a ceiling. This cover is collapsible by means of detaching the unit from the stroller, sandwiching together the two panels and twisting into a figure eight form to compact. Rain protection is disclosed in addition to wind protection.

In practice, collapsing by twisting the unit's sandwiched side panels into a figure eight and then into a loop takes some practice to master, even when instructions are provided. Additionally, although the requirement for an overhead canopy stroller is not disclosed for use in conjunction with this windscreen, the side panel mount configuration presents an unstable and drooping ceiling when a canopy is not present, leading to pooling of water in the rain resistant embodiment, and circumstances of confined overhead space in both embodiments. Also, access to the occupant is difficult without removal of the cover because the side panels are fixed, and a front panel is stretched between the two side panels, unless the caregiver accesses the occupant via the drooping ceiling when a canopy is not present. Furthermore, this design does not disclose protection from insects.

U.S. Pat. No. 6,517,153 to Brewer shows a protective cover for infant carrier seat that keeps the ceiling away from the occupant by means of the flexible canopy support member that is permanently affixed to the infant carrier. Therefore this cover is limited by its inability to be interchangeably affixed to infant seats that do not have this canopy support member.

As a diversity of seating product configurations proliferate, there still exists a need for a protective cover that can be interchangeably affixed to a multiplicity of seating products and the like that protect against the afore mentioned hazards, and addresses the deficiencies of known protective cover arrangements.

It is a well-known ventilation engineering principle that to maintain the same quality of ventilation, a small encloses space with a window of a given cross sectional area and one occupant will require more frequent air changes per hour than a larger enclosed space with the same window size. In addition, if the larger room is provided with a larger window, the speed of air replacement will increase, thereby further improving the ventilation for the occupant. Accordingly, it is an object of this invention to provide a protective cover, which overcomes the afore mentioned hazards and that can be interchangeably affixed to a multiplicity of seating products and the like that substantially encapsulates the occupant, while improving ventilation by increasing the internal volume of the protective cover by increasing the overall surface area generally, and specifically by increasing the side panel ventilation cross sectional area.

It is a commonly accepted fact that confined spaces can result in unwanted psychological effects such as for example feelings of confinement or claustrophobia. Increasing the space afforded to an occupant of an enclosure such as a protective cover helps to mitigate these unwanted effects. Additionally, providing a panoramic view to the occupant can also mitigate these unwanted effects. Therefore, it is an object of this invention to provide a protective cover, which overcomes the afore mentioned hazards and that can be interchangeably affixed to a multiplicity seating products and the like that increases the internal volume and affords a panoramic view and therefore reduces the potential for unwanted psychological effects associated with a protective cover with a smaller internal volume.

Known protective covers have provided ports for viewing the occupant such as from side vents or ceiling windows for example. Improving the convenience to the caregiver by affording a full view, from every possible angle, of the occupant of the seating device while the protective cover is in place is important for reasons of safety, and peace of mind. Therefore, it is an object of this invention to provide a protective cover that overcome the afore mentioned hazards and that can be interchangeably affixed to a multiplicity of seating products and the like that affords improved visibility of the occupant by the caregiver from all angles including the top.

The use of protective covers is becoming more wide spread as public awareness increases of the need to improve the well being of occupants and to protect occupants from the afore mentioned hazards and the like. In promotion of increased use of protective covers that improve the well being of occupants, it is therefore an object of this invention to provide a protective cover, which overcomes the afore mentioned hazards and that can be interchangeably affixed to a multiplicity of seating products and the like, which improves the caregiver's ease of use of the protective cover by affording ready access to the occupant without the need for removing the cover altogether and that affords a means of conveniently and compactly stowing the cover out of the way when not in use.

Before mounting known protective cover configurations to the seating products, the cover material or fabric must be unfolded, turned right side out, or arranged prior to mounting to the seating product. Thus the caregiver is faced with the need to spend time to become familiar with the proper mounting position of the cover each time prior to mounting it to the seat. This costs time and can cause frustration. It is an object of this invention to improve the convenience to the caregiver by providing a protective cover that is self-erecting such that the protective cover is self-deploying into a final mountable configuration, effectively reducing the time required to deploy the protection cover so that the caregiver can rapidly mount the protective cover to the seating product with ease.

Although known self supported ceiling protective covers configurations are comprised of ceiling support elements such as flexible rods, members, U-shaped arches, and canopies, storing these covers requires deliberate bending of the support element and folding of the unit into a compact form of the correct size and shape to fit into a storage compartment. In other cases, the compacting method is complicated, required that the user follow detailed instructions. These methods do not always yield the same results, and the user can end up with a bulky collapsed shape, a stored unit whose material or fabric is turned inside out, or a unit that requires re-assembly before attachment to the seating device, thereby requiring additional time and concentration to subsequently unfold and deploy for use. Therefore, it is an object of this invention to provide a protective cover that can be interchangeably affixed to a multiplicity of seating products and the like, which overcomes the afore mentioned hazards, and that can be rapidly and consistently collapsed into the same compact configuration every time, without disassembly of its basic parts, so that it can be stowed away for convenient transport by the caregiver and subsequently rapidly deployed in the same consistent manner every time.

Known protective covers offer one or more flaps that can be used to protect against sun, rain, wind and the like. Known protective covers typically use flaps that are permanently attached to the covers and that pull back out of the way when not in use. These permanently affixed flaps represent bulk to the total assembly when not in use. For example, a flap for rain may not be required in a desert climate where sun is the primary concern for example. To get around this problem known protective covers are offered in different versions. This can result, for example, in a situation in which a care giver who desires to protect an infant with a protective cover, and is in a climate of more than one seasonal change may be required to purchase one protective cover to protect against sun, another against rain, and yet another against insects. In another scenario, a caregiver may wish to shield an infant from contact by strangers in public places, or to protect an infant from effects resulting from staring at overhead high intensity light sources, where rain protection would not be required. Accordingly, it is an object of this invention to provide a protective cover that can be interchangeably affixed to a multiplicity of seating products, which overcomes the afore mentioned hazards, and that provides a universal base configuration that is so constructed that it can, if necessary, be easily supplemented with rapidly attachable and removable protective layers, and whose supplementary layers can also be temporarily fastened out of the way in addition to being completely removed and stored such that a multiplicity of hazards can be addressed by one frame and one or more protective layers conveniently and compactly.

Additionally, it is an object of this invention to provide a protective cover that overcomes the afore mentioned hazards, and which can be interchangeably affixed to a multiplicity of seating devices so as to provide as close as practically possible a one-type-fits all design, insofar as most seating devices such as strollers, carriages, infant seats and the like have fixed head and foot positions and that the protective cover herein disclosed is designed to span these head and foot positions, such that in one respect manufacturing costs are reduced corresponding to the reduction in variety of sizes offered, and as well in the reduction of types insofar as types are reduced by the use of supplementary protective layers.

Additional objects and advantages of the invention will be set forth in part in the description which follows and in part will be obvious from the description, or may be learned by practice of the invention.

SUMMARY OF INVENTION

With these objects in view, according to an aspect of the present invention there is provided a collapsible cover for protecting an occupant in a seating unit having a head region and a foot region. The cover has a body comprised of a flexible material having a top portion and at least one side wall portion, the top portion having a generally ellipse shape and having a length to span the distance between the head region and foot region of the seating unit and a width to span the width of the seating unit. The sidewall portion is connected to the top portion along a substantial portion of the periphery of the top portion to provide an arched configuration to the top portion. The cover further has a single closed loop frame member made of a flexible, coilable, resilient material, that is secured along the length of the structure's membrane body so as to assume an ellipse-like shape when viewed from above, that is bent into an arched configuration about its minor axis. The closed loop frame member is movable between an extended orientation to allow the cover to be attached to the seating unit and a collapsed orientation to allow for a reduced size of the cover for transport and storage and is connected to the periphery of the top portion to provide in the extended orientation an arched ellipse shape about the length of the top portion. The cover also has a means for releasably attaching the cover to a seating unit In an aspect of the invention, the sidewall portion is comprised of a pair of opposed side panel membranes of at least one layer of material, preferably formed into a semi circular-like shape, said side panel membranes being reinforced to prevent deformation of their semi circular-like shape, and to prevent relaxation of the arched configuration of the ceiling membrane.

In another aspect of the invention the cover is provided with a frame sleeve formed either integrally into the top portion, or separately which adjoins the top portion to the sidewall portion, said frame sleeve holding the closed loop frame member.

In yet another aspect of the invention, the cover is provided with a skirt connecting the opposing side panel membranes such that the skirt allows for releasable attachment of the cover to the seating unit by means of an elasticized hem such that the skirt may hug the peripheral of the seating product to provide a sealing action.

In a further aspect of the invention, the cover is provided with at least one layer of supplemental cover membrane, in the approximate shape of the top portion, that can be attached to said top portion so as to provide at least one additional protective layer. This cover membrane as well as the top portion, may be comprised of conjoined types of membranes, that can provide protection from the elements. This cover membrane may also have side flaps permanently or temporarily affixed that may drape over the side panel membranes, be fastened temporarily so as not to flap about, afford further protection and may be similarly comprised of conjoined types of membrane. The entirety of the cover membrane and side panels may be stored when not in use by folding or rolling or removing completely from the membrane ceiling.

In yet another aspect of the invention there is provided a collapsible cover for a seating unit having a frame member that may be formed from flexible, resilient material that can be coiled. In one embodiment of this invention the frame member is flat spring steel wire or equivalent that is comprised of materials or that is treated or encapsulated in some manner so as to resist corrosion. In another embodiment of this invention the frame member is a synthetic polymer, alloy of metal, composite material, or the like that has aforementioned frame member properties.

In yet another aspect of the invention there is provided a restraining element to retain the collapsed cover in its reduced-size coiled state with or without its supplemental cover membrane. Such restraining element can be a pouch or elastic or strap or clip to hold the cover in its reduced state.

In another aspect of the invention, is the cover is adapted to be mounted on an infant seat such that the opposing ends are releasably held to the foot and head position of the infant seat by means of the previously described peripheral skirt, which can uninterruptedly surround the continuous perimeter of the infant seat so as to provide stable attachment of the cover frame member to the head and foot position of the infant seat.

In another aspect of the invention, the cover is provided a stiffening means to aid in stably fastening and spacing the top portion above the seating unit. Preferably, the stiffening means is a U-shaped stiffener fastened to the frame member at the foot position and subsequently fastened by means of clips, straps or the like to the legs of the seating device.

BRIEF DESCRIPTION OF THE DRAWINGS

The invention will now be explained in detail with reference to the drawings, which In FIG. 1 shows the first embodiment of the protective cover mounted on an infant seat, In FIG. 2 shows a minimal configuration of the first embodiment, In FIG. 3 shows the first embodiment of the protective cover with the top opening closable by zipper, In FIG. 4 shows the first embodiment of the protective cover with the top opening closable by elasticized flap, In FIG. 5a shows the second embodiment of the protective cover mounted on a three-wheel stroller, In FIG. 5b shows the second embodiment of the protective cover with alternative stiffener fixing position, In FIGS. 6a and 6b shows one configuration of a stiffener, In FIG. 7a shows the third embodiment of the protective cover mounted directly to the footrest position of a stroller, In FIG. 7b shows the third embodiment of the protective cover mounted by means of stiffener, In FIG. 8 shows a method of adjusting the elasticized perimeter, In FIGS. 9a and 9b shows the connector for joining the frame member into a loop, In FIGS. 9c and 9d shows the connector for joining the frame member into a loop that also captivates the stiffener, In FIG. 9e shows a means of temporarily captivating the stiffener while joining the frame member into a loop, In FIG. 10a shows the frame sleeve arrangement, In FIG. 10b shows an alternative frame sleeve deriving from the ceiling membrane, In FIGS. 11a to 11c shows a method of compacting the protective cover with a flat geometry frame member, In FIGS. 12a to 12d shows another method of compacting the protective with a round geometry frame member, In FIG. 13 shows the natural deployed configuration of the protective cover, In FIG. 14 shows an elasticized restraining element, In FIG. 15 shows a storage pocket, In FIG. 16 shows a storage pocket hanging on an infant seat, In FIG. 17 shows the cross ventilation features of the protective cover, In FIG. 18 shows the protective cover with side panel reinforcements and ceiling mounted activity strap, In FIG. 19 shows the lip at the perimeter of the frame sleeve for mounting covers, In FIG. 20 shows a supplementary cover mounted on the protective cover, In FIG. 21 shows a supplementary cover with side flaps mounted on a protective cover, In FIG. 22*a* shows an alternative method of mounting the stiffener to the protective cover frame, In FIG. 22*b* shows a detachable clamping means.

DETAILED DESCRIPTION OF THE INVENTION

Figure 1:
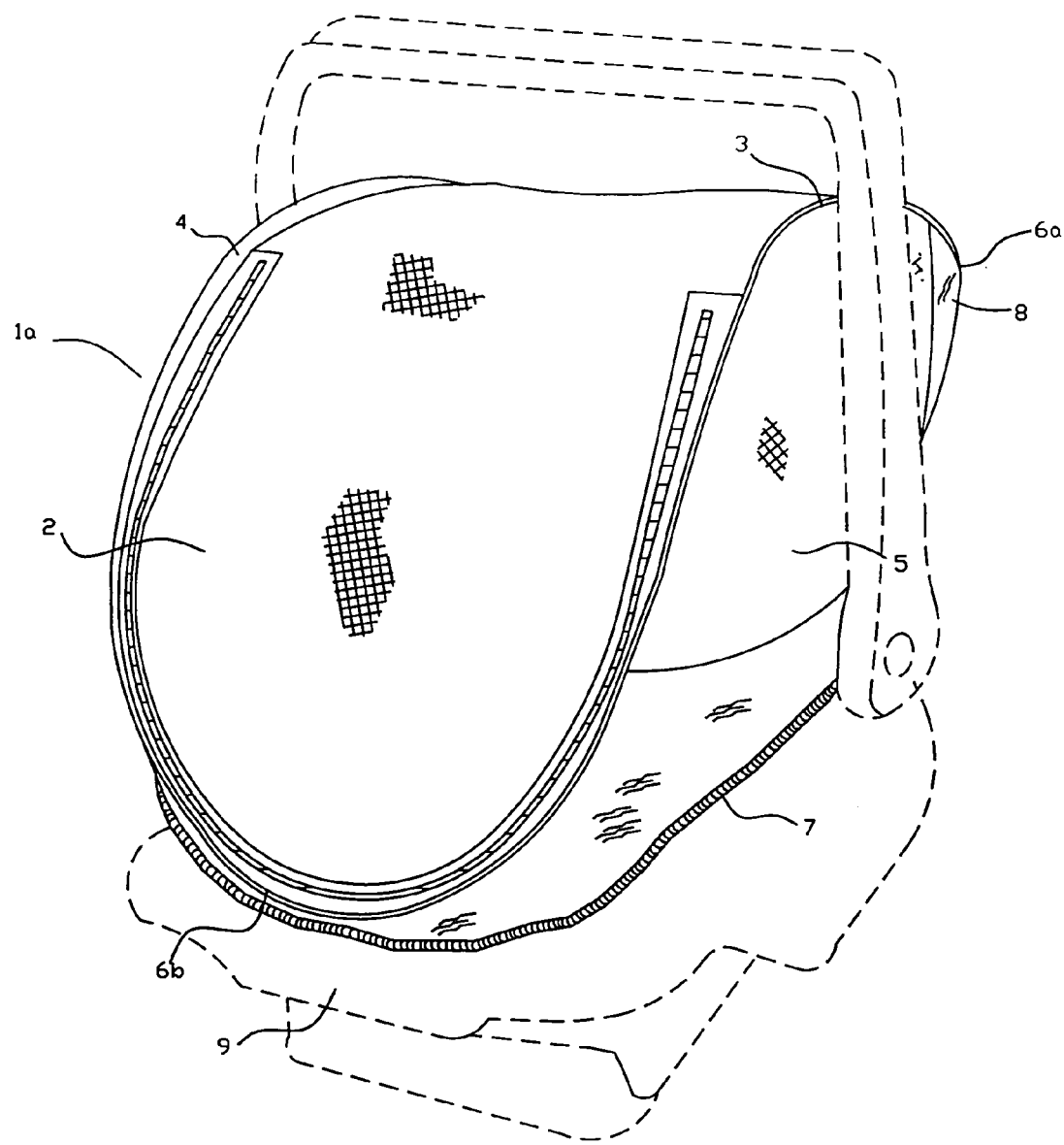

As shown in the FIG. 1 to FIG. 22, the present invention is directed towards a collapsible cover for protecting an occupant of a seating unit that satisfies the afore-mentioned objectives, of which three preferred embodiments are shown in FIGS. 1*a*, 1*b*, 1*c* and select associated configurations and constituents are herein described.

Figure 5A:
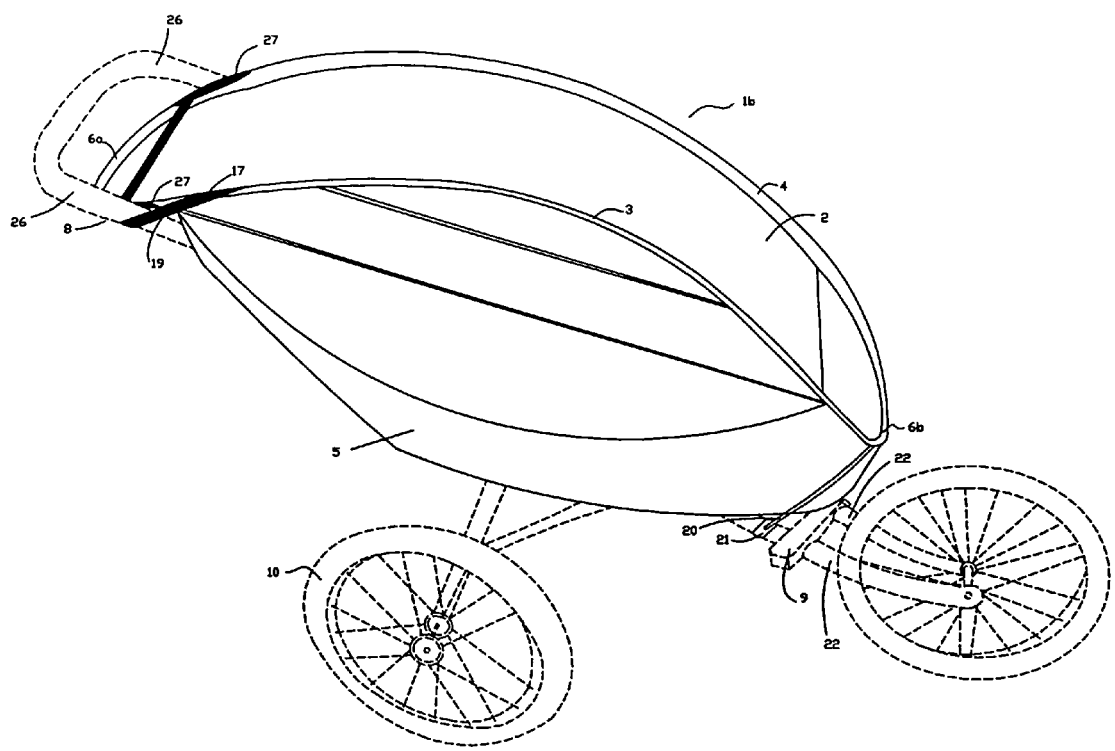
Figure 7A:
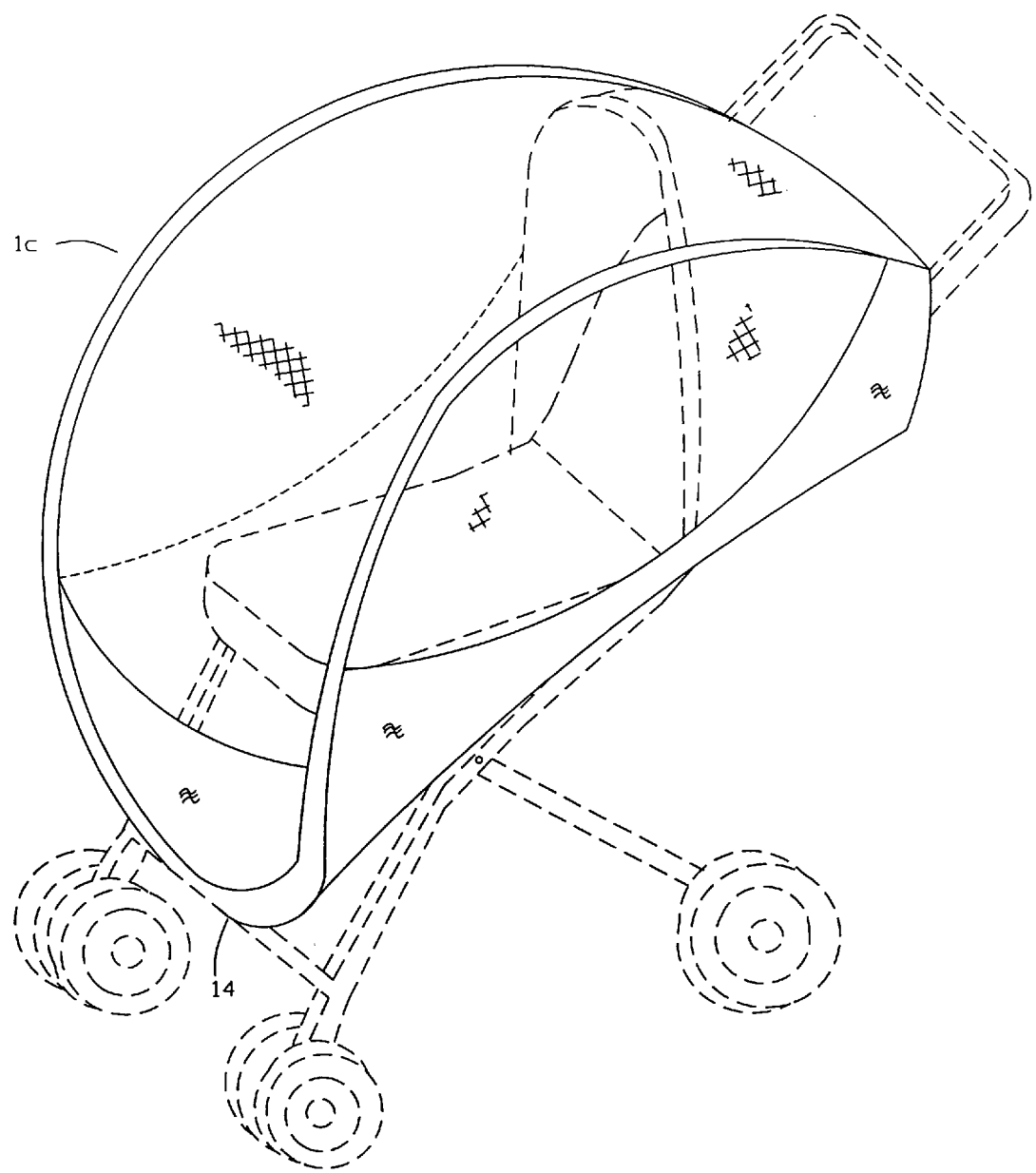

Referring to the drawings and embodiments of the invention herein illustrated, FIG. 1 illustrates a first embodiment of the protective cover of the present invention mounted on an infant seat with handle, FIG. 5*a* illustrates a second embodiment of the protective cover of the present invention mounted on a three wheel stroller which utilizes a stiffener for attachment to the foot of the stroller, and FIG. 7*a* illustrates a third embodiment of the protective cover of the present invention mounted on a four wheel stroller which fastens at the foot position directly. Examples of alternate seating products to which the protective cover of the present invention can be mounted are bouncy chair, shopping cart infant seat, swing chair, wheel chair and the like. Other seating products, afore mentioned, are equally applicable such as the umbrella stroller. Furthermore, it will be learned from practice of this invention that by simple modifications of dimensions such as the major axis of the ceiling, double strollers and the like can be accommodated. Tandem strollers can also utilize this invention by the use of two side-by-side protective covers and some minor mounting modification. Other seating products and applications to which the protective cover invention can be mounted will become obvious through the use of this invention.

Turning to FIG. 1, the first embodiment of the protective cover of the first embodiment is depicted, which is releasably attachable onto a multiplicity of infant seating products and the like to provide protection to an occupant of the seating unit. The protective cover is held into this arched shape by a frame member 3 which is connected to the top portion of ceiling membrane 2 by means of a frame sleeve 4 that is in turn connected to the sidewall, which in the first embodiment is coprised of a pair of reinforced semi-circle-like-shaped side panel membranes 5. The cover is also aided in maintaining its arched shape in part due to its method of fixedly holding the head 6*a* and foot 6*b* of the frame member 3 to the seat by means of a elasticized skirt perimeter 7 or other such means as will be disclosed herein. As only the widths at the head position of the cover 6*a* and at the foot position 6*b* of the frame member 3 are in contact with the head 8 and foot 9 positions of the infant seating product, and as all such infant seating products and the like have corresponding head and foot positions, this arched shape is particularly suited to mounting on a multiplicity of infant seating products. The skirt perimeter 7 secures the head 6*a* and foot 6*b* of the frame member 3 to the seat by means of a cord, elasticized element, drawstring or the like, which can be integral to the skirt perimeter 7 or encapsulated within a sleeve at skirt perimeter 7 to simultaneously provide a sealing function around the perimeter of the seat.

Figure 2:
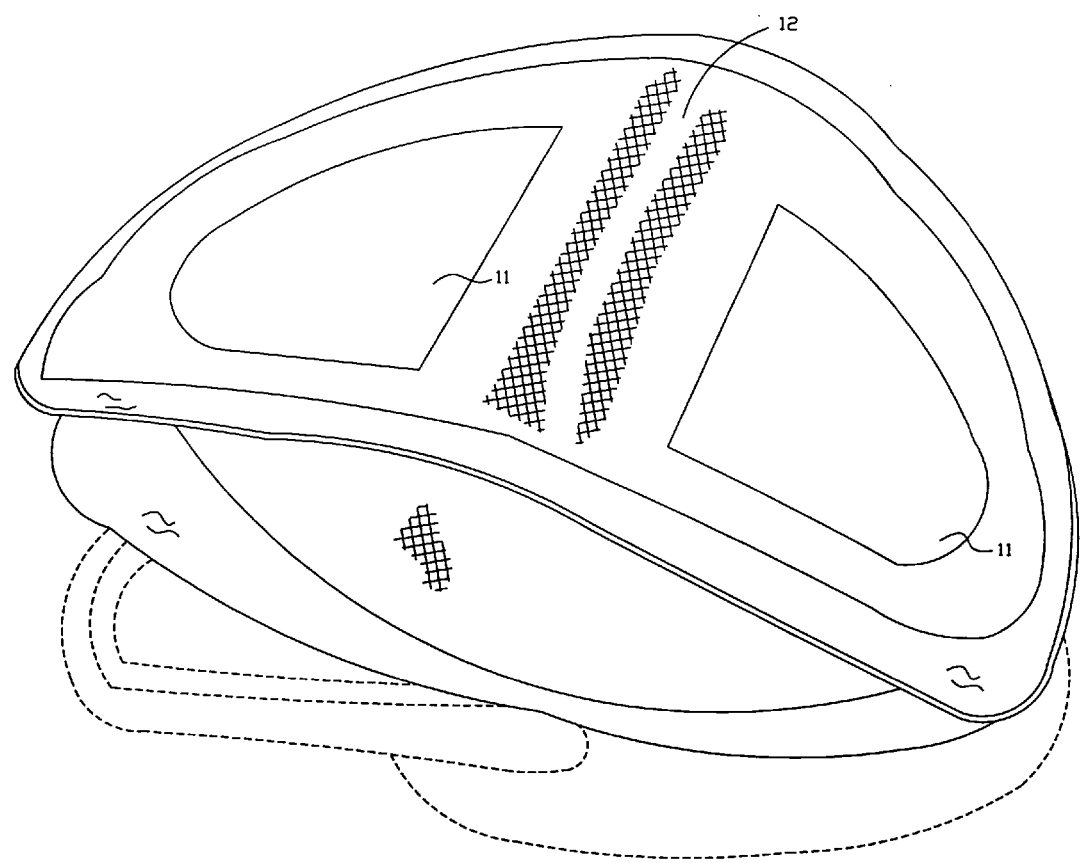
Figure 3:
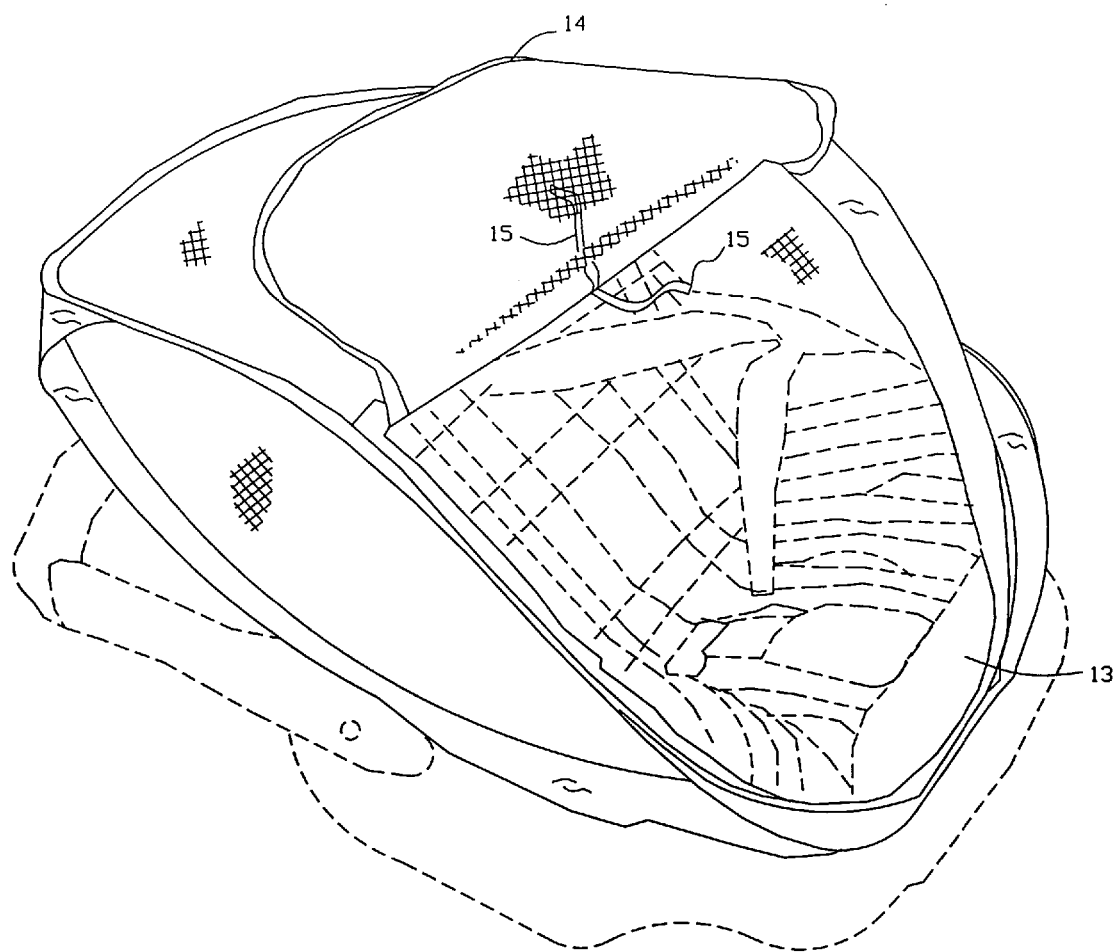
Figure 4:
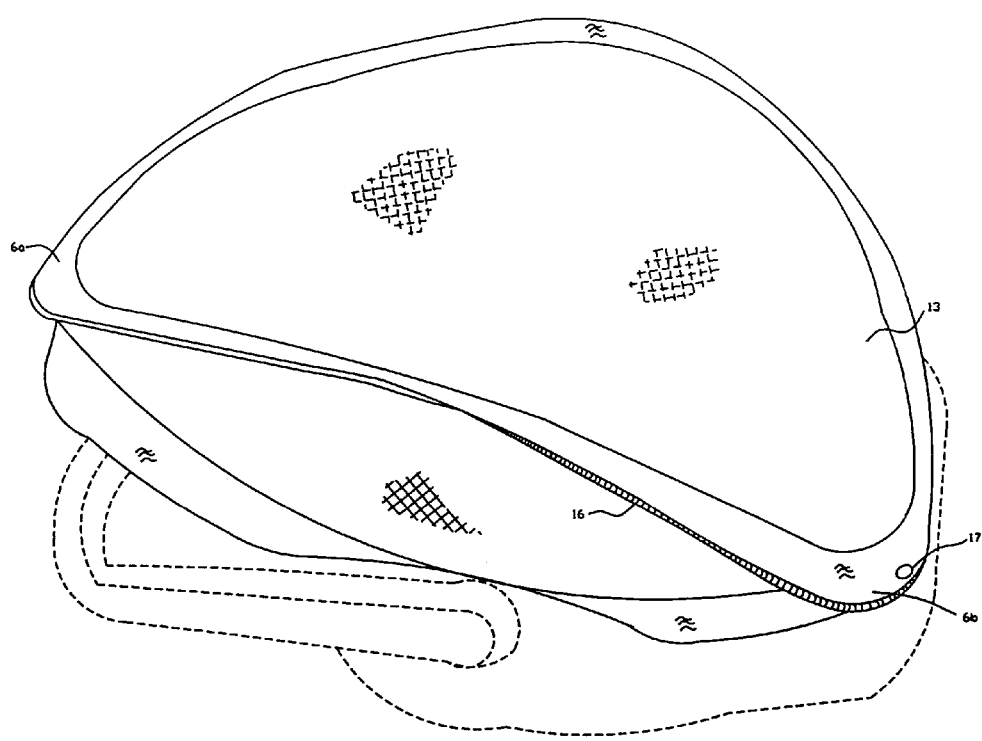

FIG. 2 illustrates a minimal configuration of the first embodiment, which has a top opening to allow for access to the occupant of the seat. In the embodiment of FIG. 1, two top openings 11 are provided with a center web therebetween to help in maintaining stability which is further enhanced by means of reinforced side panel membranes. In the preferred embodiment, FIG. 3 illustrates an example of a top opening 13, which is closable by means of zipper flap 14 and optionally tied back by means of a tie 15 or other such methods as is known to those familiar with the art. In another embodiment, FIG. 4 shows the top opening 13 closable by means of elasticized flap 16 and secured from inadvertent removal by means of button or snap 17 at the head 6*a* and foot 6*b*. The ability to open the cover wide enough to allow access to the occupant of the protective cover is afforded by the large minor axis, or width of the elliptically shaped ceiling membrane, due in part to the frame member loop geometry forming the ceiling membrane, and in part due to the reinforced side panel membranes. The advantage of openings in the ceiling membrane is that the caregiver is not required to remove the protective cover from its mounted position on the seat in order to access the occupant.

Turning to FIG. 5*a*, the second embodiment illustrates a protective cover 1*b* that fits on a multiplicity of carriages, here shown on a three-wheel stroller 10. Similar to the first embodiment, the cover is held in its arched shape, in part due to the arched shape of a frame member 3 which is connected to the ceiling membrane 2 by means of a frame sleeve 4 that is in turn connected a pair of reinforced semi-circle-like-shaped side panel membranes 5, and in part due to its connection to the head 6*a* and foot 6*b* of the frame member 3 to the carriage by means of a stiffener 20 and clamping means 21 at the foot position 9 of the stroller and an elasticized strap 19 to the carriage at the head position 8, or by other such means as will be discussed herein. As only the head 6*a* and foot 6*b* of the frame member 3 are fastened to the carriage head position 8 and carriage foot position 9, and as all stroller or carriages have corresponding head and foot positions, this arched shape is particularly suited to mounting on a multiplicity of carriage types.

Figure 5B:
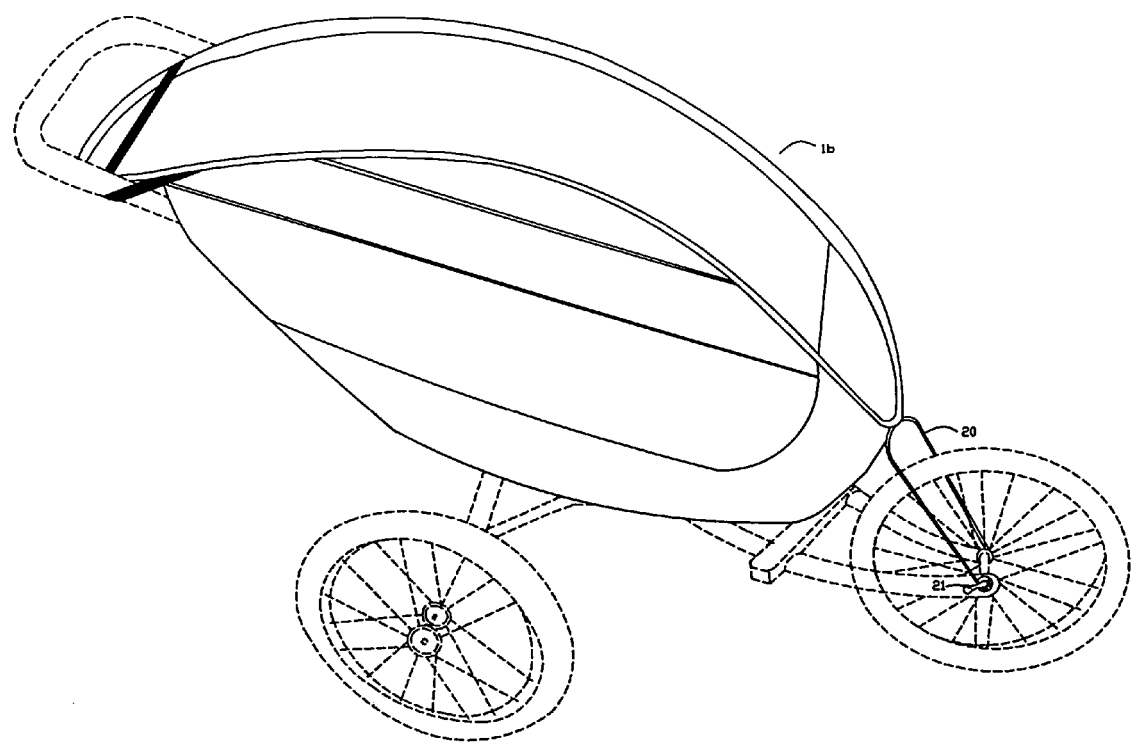

In this embodiment, a stiffener 20 and clamping means 21 secure the foot 6*b* of the frame member 3 to the stroller or carriage foot position 9 at the wheel posts 22 of the stroller, thereby providing a rigid connection. The use of a stiffener also provides a clearance for the feet of the occupant. The clamping means 21 is to eliminate axial rotation of the stiffener 20 about the wheel posts, and can be comprised of strapping, clips, clamps, or other fasteners that provide appropriately secure connection of the stiffener 20 to the wheel posts 22. Although not shown here, a permanent bracket may also be affixed to the wheel post in order to captivate the stiffener and achieve a clamping means as effective as others. FIG. 5*b* illustrates an alternative fixing method of stiffener 20 directly to the quick release wheel fasteners 21, which could alternately be permanently affixed thereto and the stiffener 20 detached from the frame member by means described herein in FIG. 9*e*.

Figure 22A:
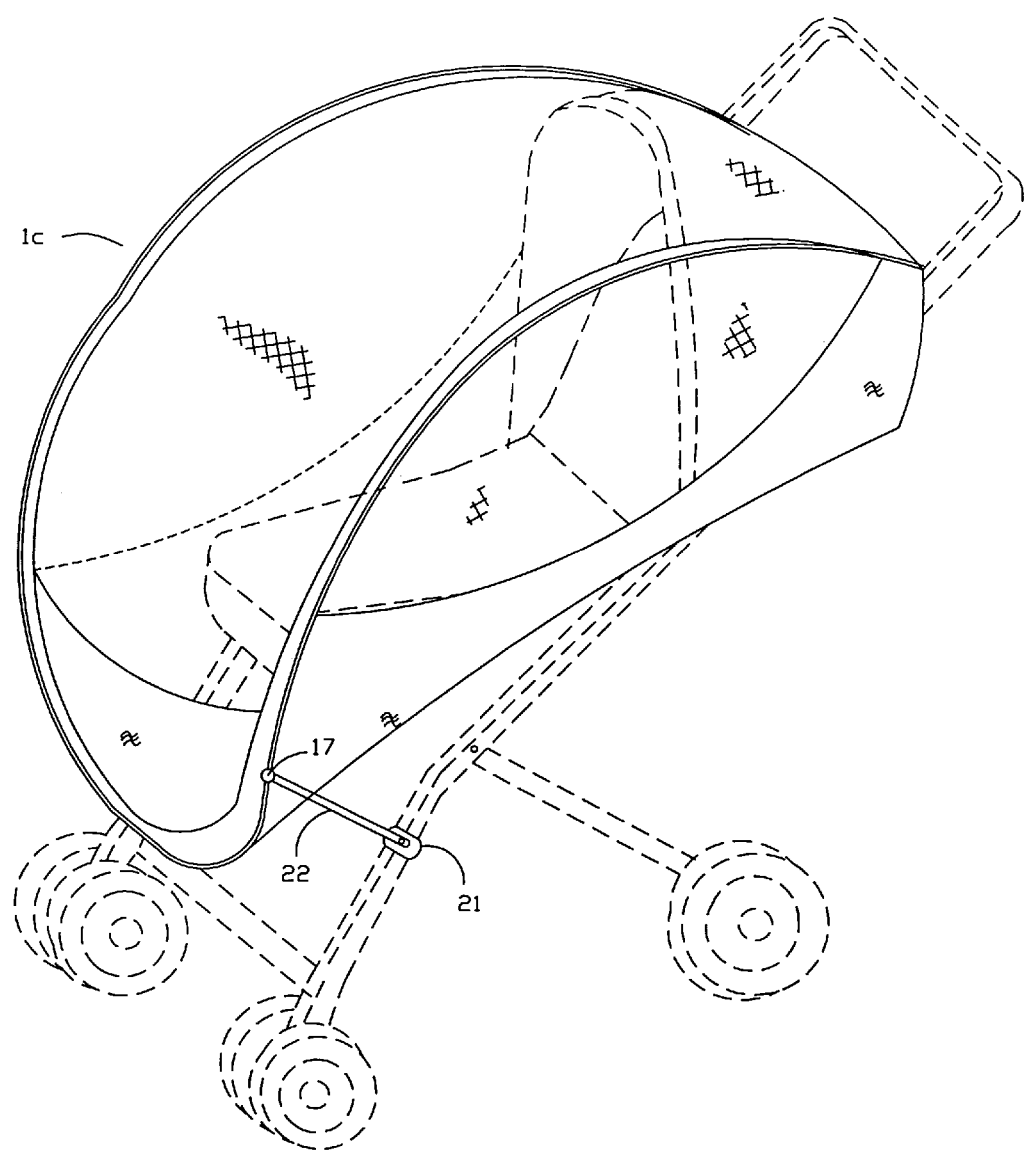

In another example, one stiffener is used on either side of the stroller cover lengths as illustrated in FIG. 22a. The stiffener 20 can be permanently or detachably attached to the frame member 3 by a clip or snap 17 or other such means as is known to those familiar with the art as long as the stiffener 20 is prevented from rotating about the frame member 3. The stiffener 20 is also prevented from rotating axially about the wheel posts 22 by a clamping means 21.

Figure 22B:
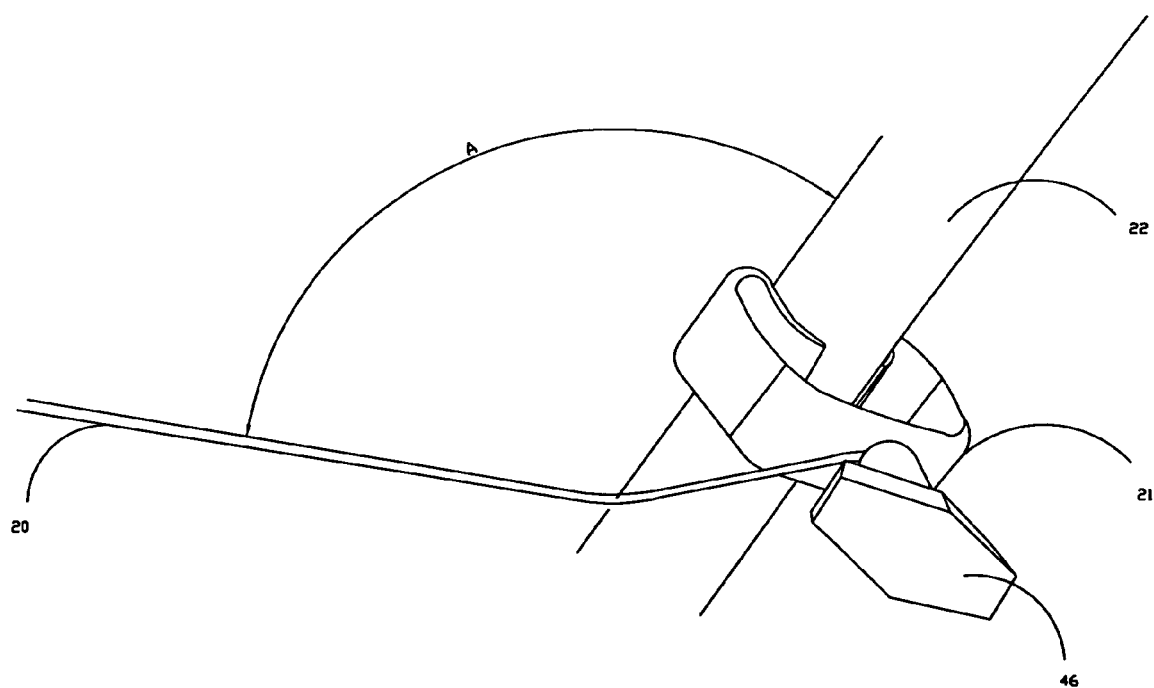

It can also be seen in FIG. 22b that the stiffener 20 angle A to the wheel posts 22 and the clamping means 21 can be adjustable and is tightened to the desired angle by a fastening means 46, in this case a wing nut type compressive nut fastener, but other types of fasteners can be employed. Adjusting the angle of the stiffener in the direction parallel to the wheel posts and clamping means can also be achieved by numerous methods that are apparent to those familiar with the practice. Furthermore, adjustment of the angle of the stiffener in the direction parallel to the wheel posts is not necessary in applications where the stiffener angle will be known in all cases. In this case the clamping means 21 is depicted as a removable and adjustable spring element that accommodates various wheel post diameters and profiles. Although not shown here, a permanent bracket may also be affixed to the wheel post in order to capture the stiffener and achieve a clamping means as effective as others. In addition, although the stiffener is depicted as a wire shaped rigid member, its geometry can vary as long as the geometry achieves the object of providing stable fixation of the frame member to the carriage.

As can be appreciated by the forgoing descriptions, a myriad of possible fastening configurations of the frame member to the carriage or seat product at the foot, head or perimeter positions are possible and shall not be limited to the descriptions herein nor shall these methods detract or in any manner nor limit the scope or novelty of the invention disclosed.

Figures 6A, 6B:
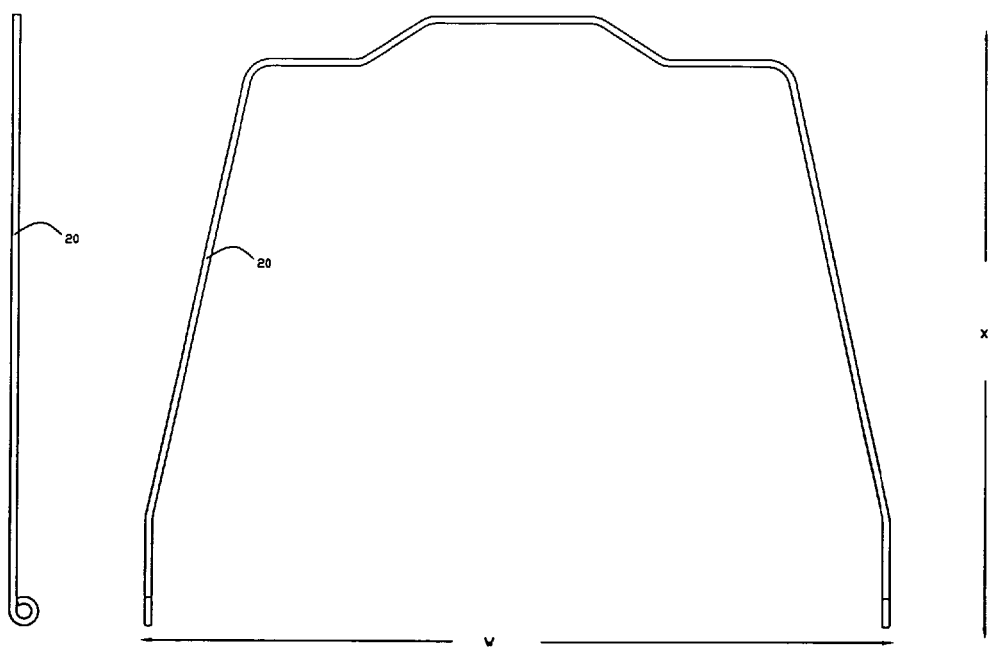

With reference to FIG. 6a and FIG. 6b an example of one configuration of a stiffener 20 is represented which is made of a material sufficiently ridge yet flexible enough to resist deformation such as spring steel, composite, fiberglass or polymer or the like, and such that the W dimension can conform to the average width of a seating device. This W dimension should be approximately the same as the D dimension of the coiled configuration described in FIGS. 11c or FIG. 12d in order to accommodate storage. Accordingly, the X dimension can be less than or equal to the W dimension.

Figure 7B:
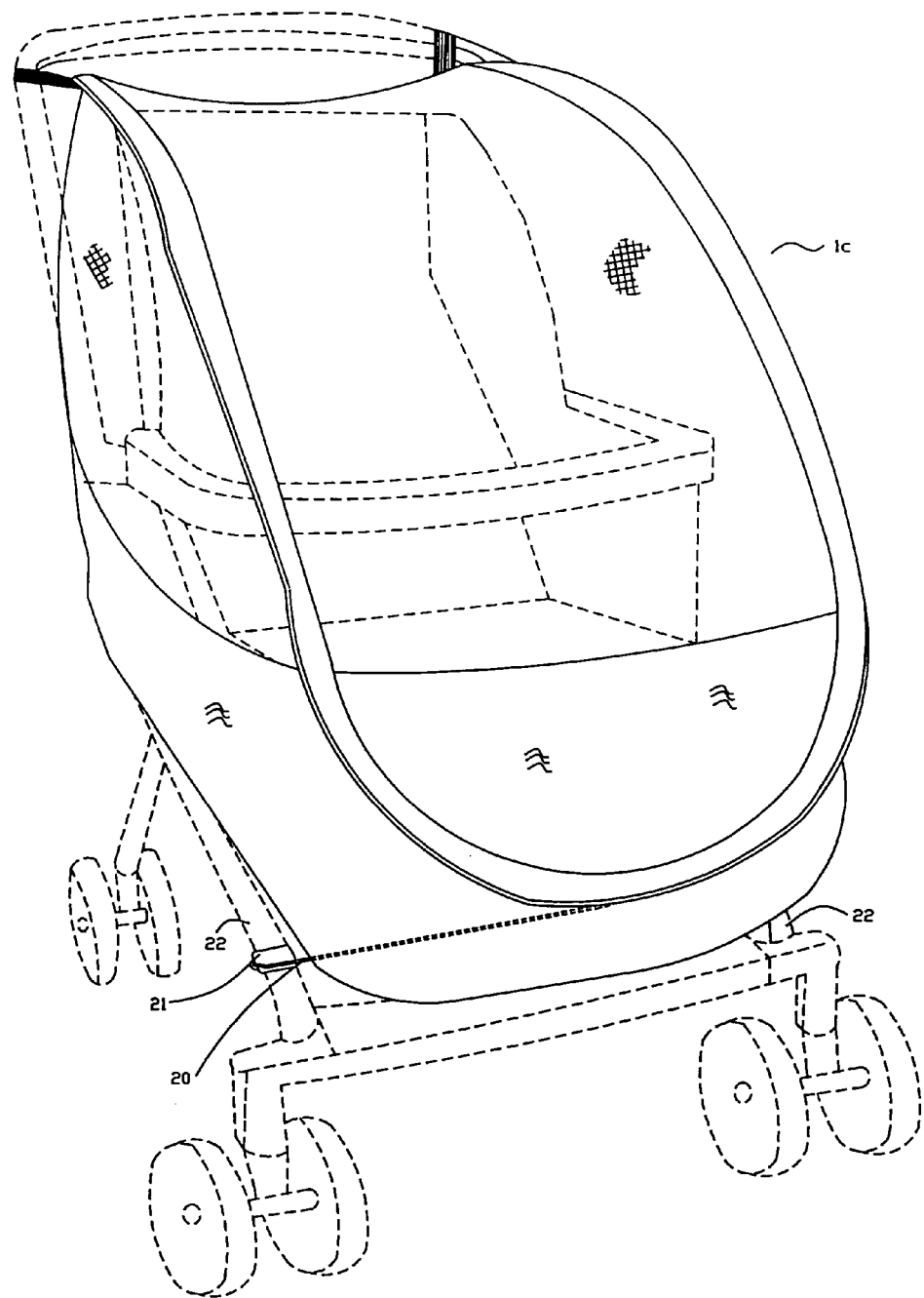

In the third embodiment shown in FIG. 7a the overall protective cover is longer along its major axis and the stiffener 20 is not used, allowing the cover to be connected directly to the footrest position 14 of the four wheel carriage by a clamping means such as strapping, hook and loop fasteners, clips, clamps or others as is commonly know to those familiar with the art. FIG. 7b depicts the third embodiment, which utilizes stiffener 20 and clamping means 21 that is attached to the wheel posts 22.

Referring to FIG. 5a, the head 6a of the frame member 3 is secured to the carriage head position 8 by means of an elasticized strap 19. This elasticized strap 19 can be easily slid around the carriage pusher posts 26 thereby effectively clamping the head 6a of the frame member 3 against the carriage pusher posts 26. A friction padding 27 made of rubberized material or the like can be effectively employed along an appropriate length of the head 6a in order to minimize slippage of the frame member 3 against the pusher posts 26. The elasticized strap 19 can be permanently stitched to the head 6a of the frame member 3 or fastened by means of a snap or button 17 or other such method as is common to those familiar with the art. The elasticized strap 19 can be replaced by an adjustable webbing material, cording, tube clips, clamps or other such means that achieves the desired clamping effect. Although not depicted, these features are equally applicable to embodiment second as to the third embodiment.

Figure 8:
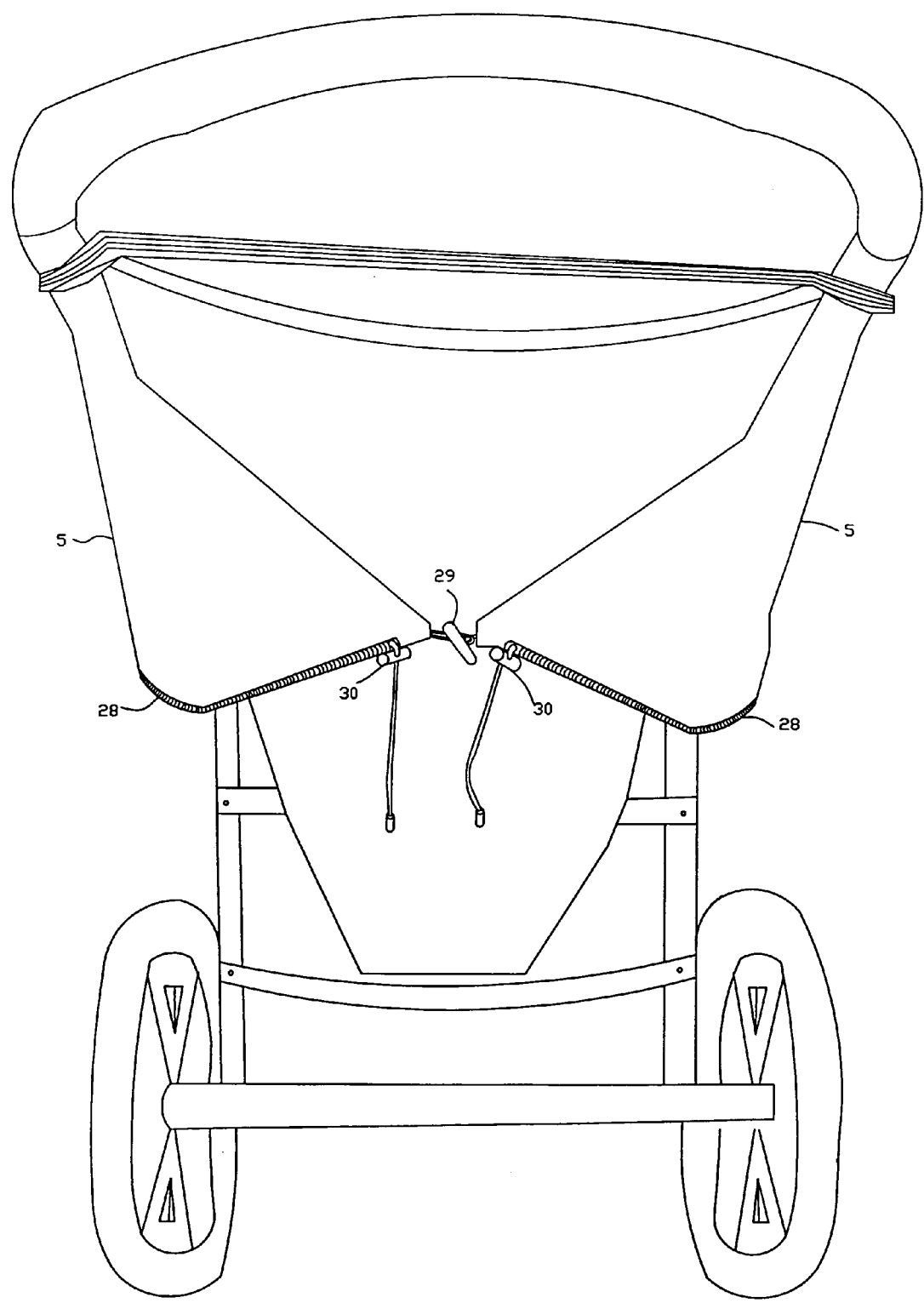

In the second and third embodiments an adjustable elasticized perimeter 28, depicted in FIG. 8 is employed to seal the lower skirt portion of the side panel membranes 5 around the perimeter of the carriage. FIG. 8 depicts the rear portion of the carriage where the elasticized perimeter 28 is joined by means of loop and button 29 such that the elasticized perimeter 28 becomes continuous and can be tightened to increase the sealing effect by means of cord grips 30 or other such means of fastening and tightening as is familiar to those in the art. Furthermore, because the side panel membranes 5 are elasticized at the perimeter, access to the occupant is readily possible from these side panels by simply lifting the panels 5 up, or by loosening the elasticized perimeter 28 and lifting the side panels 5. Alternative adjustment methods can be employed.

Figures 9A, 9B:
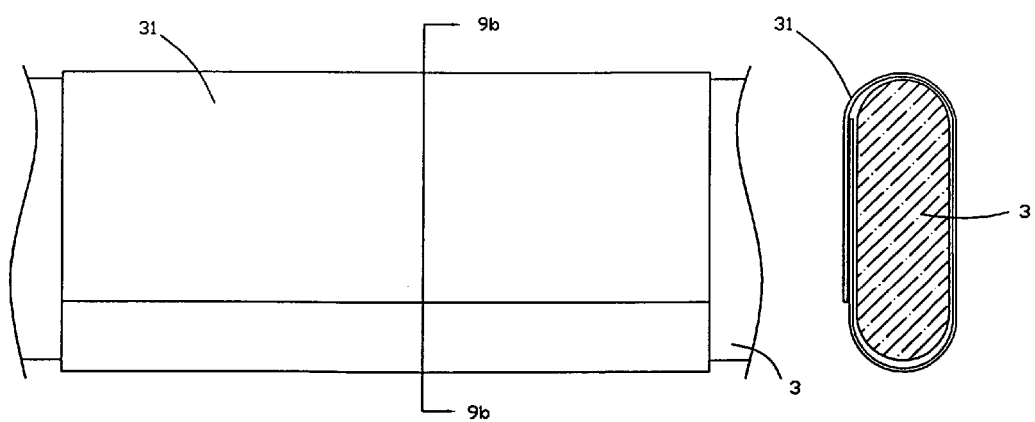
Figures 9C, 9D:
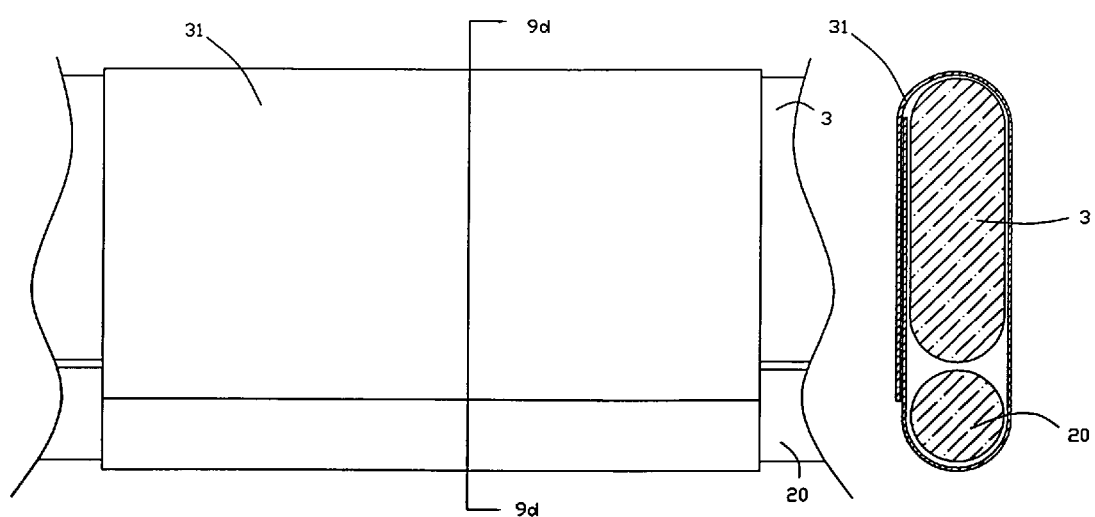
Figure 9E:
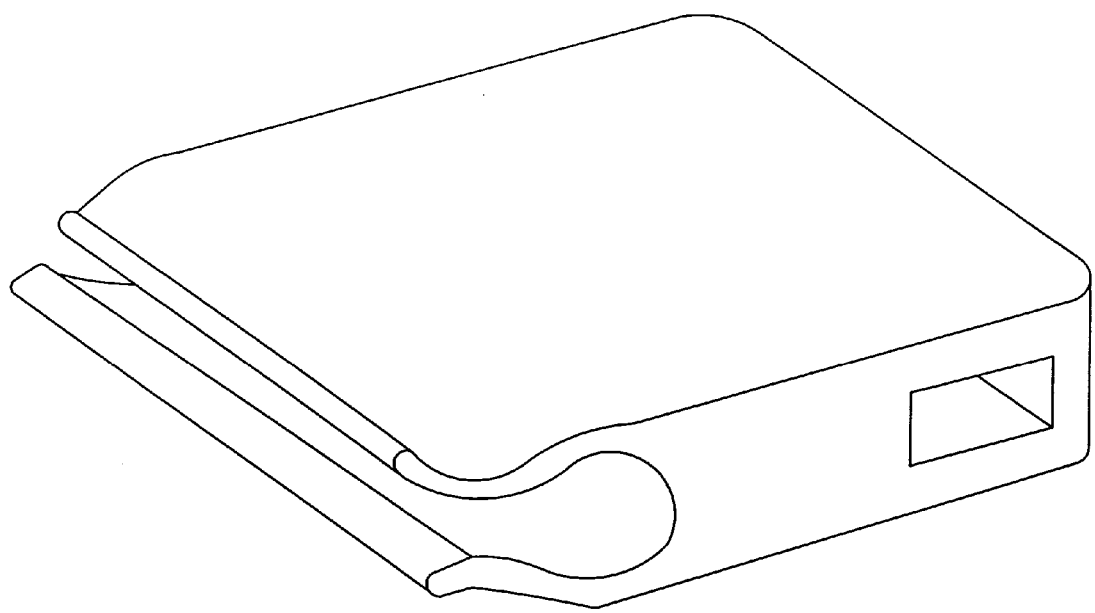

FIG. 9a and FIG. 9b depicts a perferred embodiment of the frame member wherein a connector 31 is utilized to join the ends of the frame member 3 such that it forms a continuous loop. The connector 31 is comprised of a shaped sheet material, preferably a corrosion resistant metal such as galvanized mild steel, which is crimped with a sufficient force to prevent disconnection of the frame member ends. In FIG. 9c and FIG. 9d the stiffener 20 is included in the crimped connector arrangement. In FIG. 9e an alternate system of temporarily capturing the stiffener is illustrated, where the frame member 3 is inserted and crimped into the rectangular bore end, and the stiffener 20 is removable and re-attachable at the open clip end. Alternative methods of connecting frame members of other cross sections and of joining the ends are possible as are known to those familiar with the art.

Figure 10A:
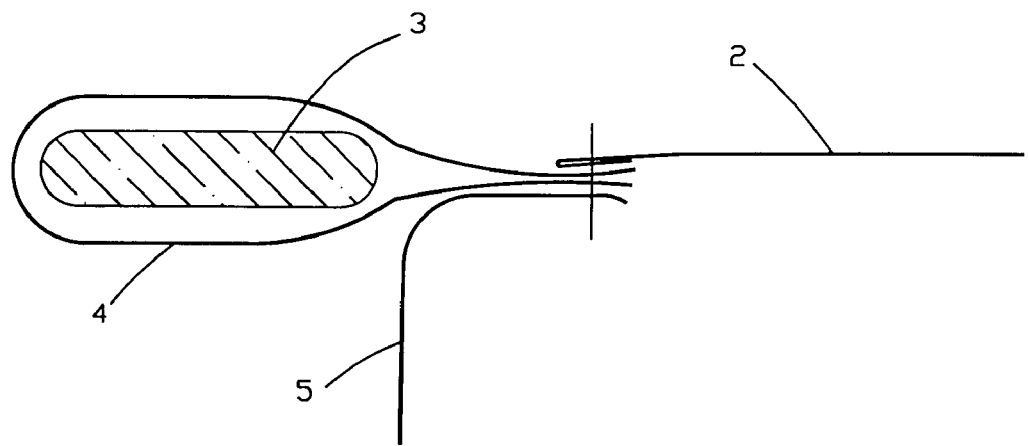

In the preferred embodiment, the frame member 3 is comprised of a flat flexible member per FIG. 10a, preferably made of a blue tempered spring steel material, which is protected from corrosion resistance. A frame sleeve 4 per FIG. 10a can encapsulate the frame member 3 and be sewn along the semi-circular like arc of the side panel membranes 5. Alternatively in FIG. 10b the frame member 3 can be sewn into the ceiling membrane 2 such that the ceiling membrane forms a frame sleeve 4, which encapsulates the frame member 3. Other methods known to those familiar with the art are also possible.

In the preferred embodiment the frame sleeve 4 is comprised of durable material capable of resisting the abrasion that will be experience from containing hard frame member 3 elements, as well as daily wear and tear.

Figure 11A:
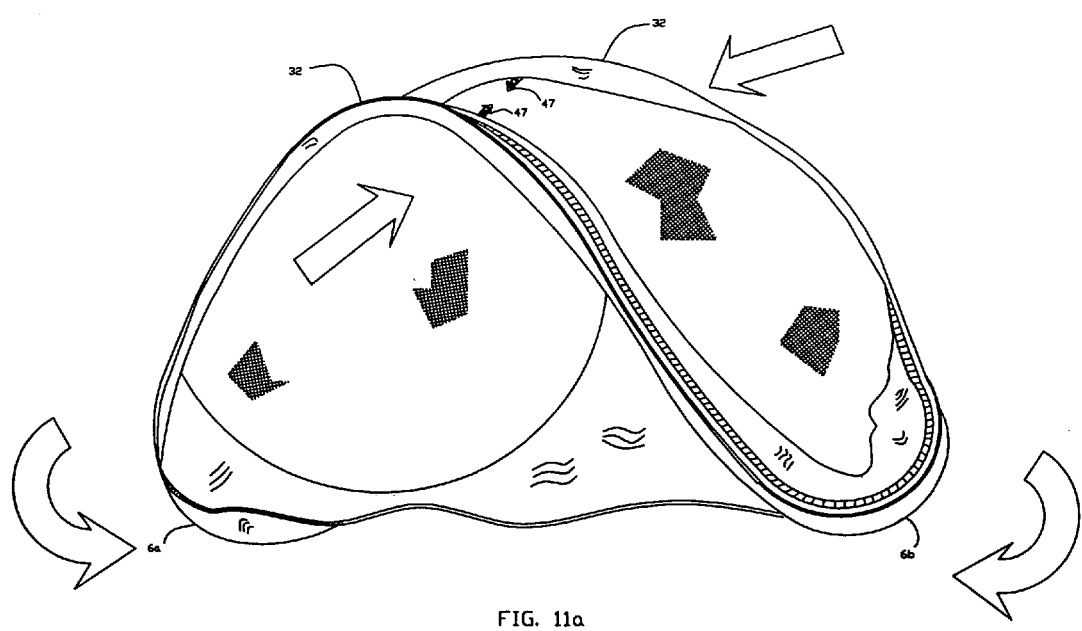
Figure 11B:
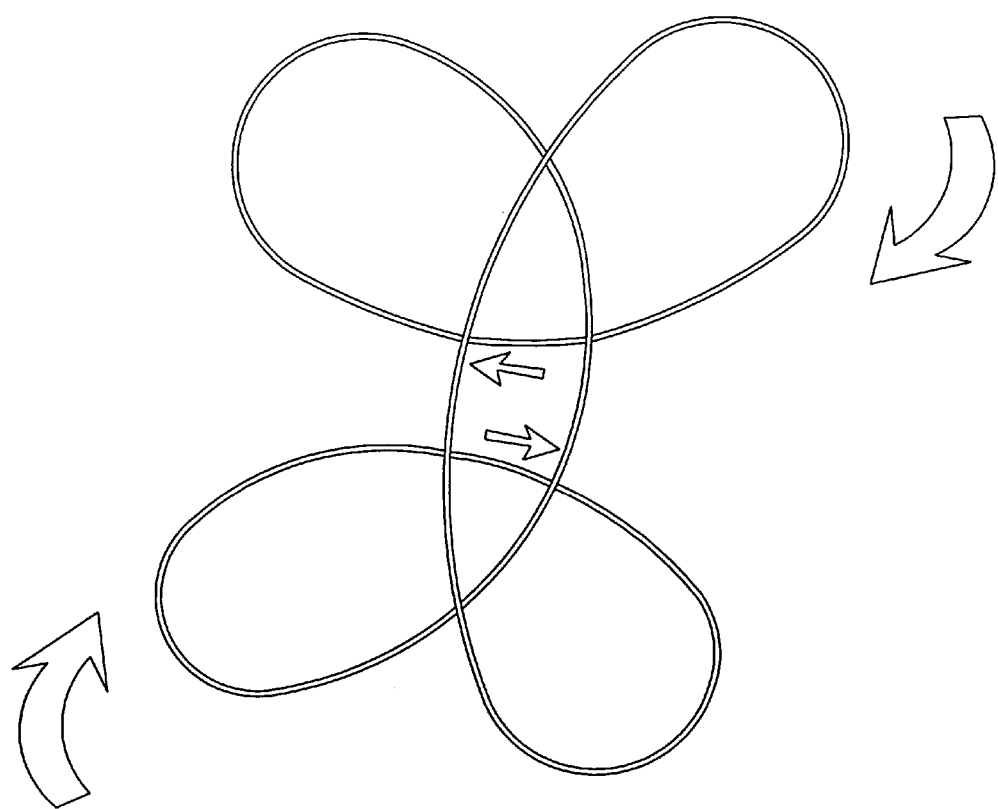

The rigidity as well as the coil-ability of the frame member 3 is a function of the member's cross sectional geometry, its material properties, and the length of frame member 3 used in a particular geometry and size of the closed loop assembly. This configuration of the frame member, combined with the relatively small size of the protective cover assembly, takes advantage of these properties by training the single loop frame member 3 into an arched shape geometry such that the head 6a and foot 6b tend to automatically move toward each other from the natural deployed configuration when the opposing frame member lengths 32 are pushed toward each other per FIG. 11a. FIG. 11b shows the intermediate position prior to the final compact coil depicted in FIG. 11c. This tendency of the protective cover to coil easily due to the training geometry is referred to as the pre-coil geometry, and is the geometry defined as the open deployed position of FIG. 13.

Prior art devices utilizing continuous loop frame members typically train the user to collapse the product by including instructions containing multiple steps which come as a separate document or are attached to a tagging. Because the pre-coil geometry of the present invention facilitates simple collapsing of the stroller cover frame member, collapsing requires no training of the user when simple instructions are affixed to the cover at the points along the frame member lengths 32 that will result in collapse of the cover. These instructions need only convey the message "push here to compact", thereby eliminating any training whatsoever on the collapse of the cover. Such instructional arrows 47 are shown affixed to the cover in FIG. 11*a*.

Figure 10B:
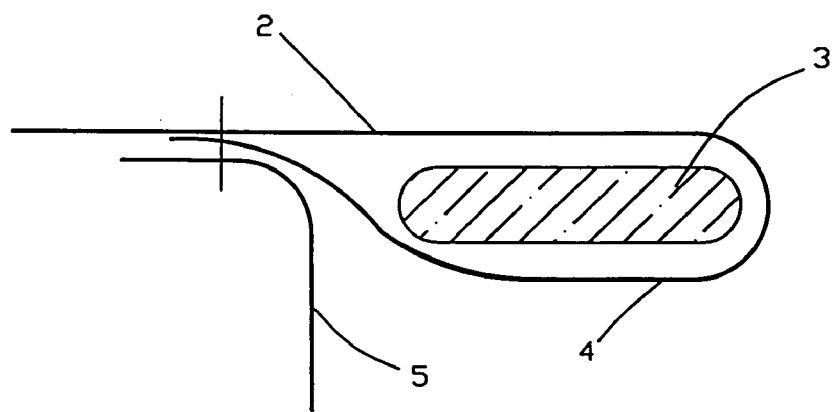

In another embodiment of this invention, the frame member 3 is comprised of a somewhat rounder cross section flexible member per FIG. 10*b*, which requires the deployed unit to be collapsed by means described in FIG. 12*a* to FIG. 12*d*. To collapse the deployed protective cover, opposing frame member lengths 32 are brought close to one another per FIG. 12*a*. Once close, they are twisted to form a figure eight shape per FIG. 12*b*. The figure eight shape is then folded per FIG. 12*c* to form two coincident circles per FIG. 12*d*.

Figure 11C:
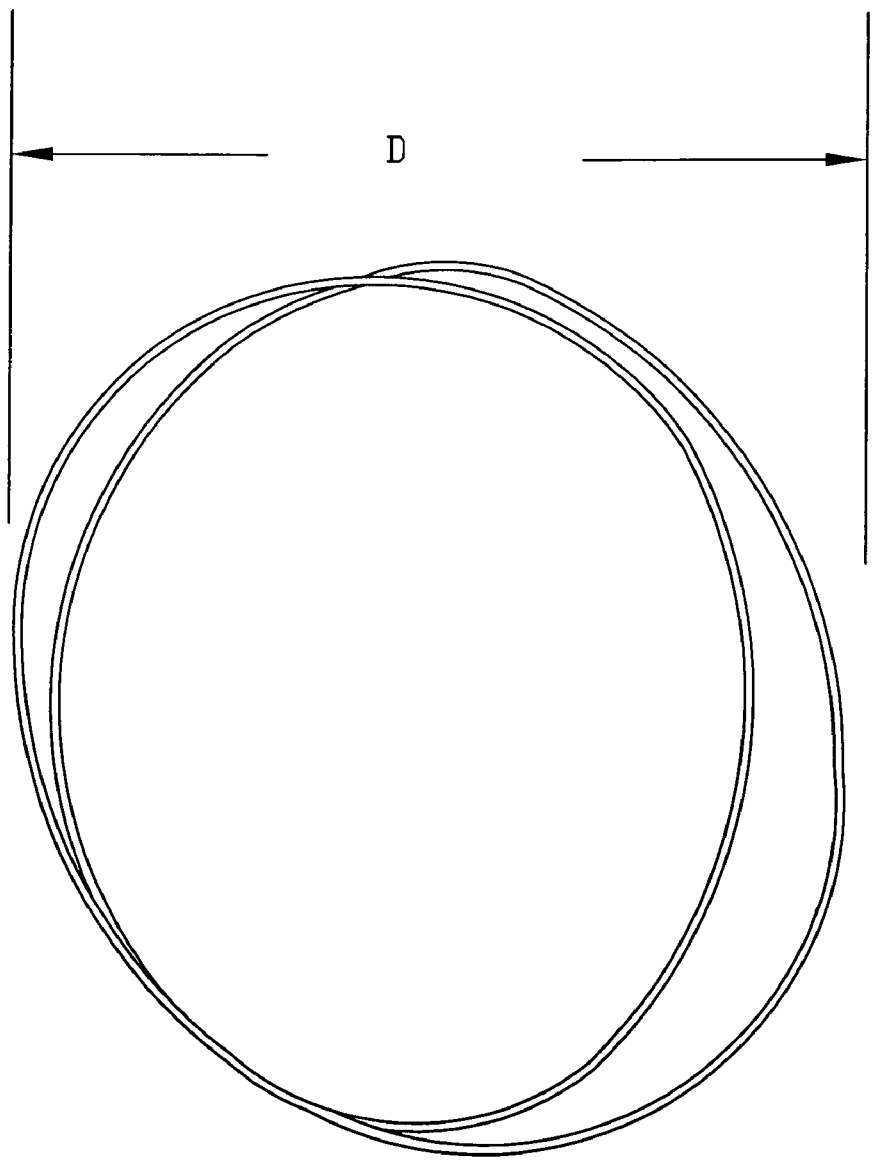
Figure 12A:
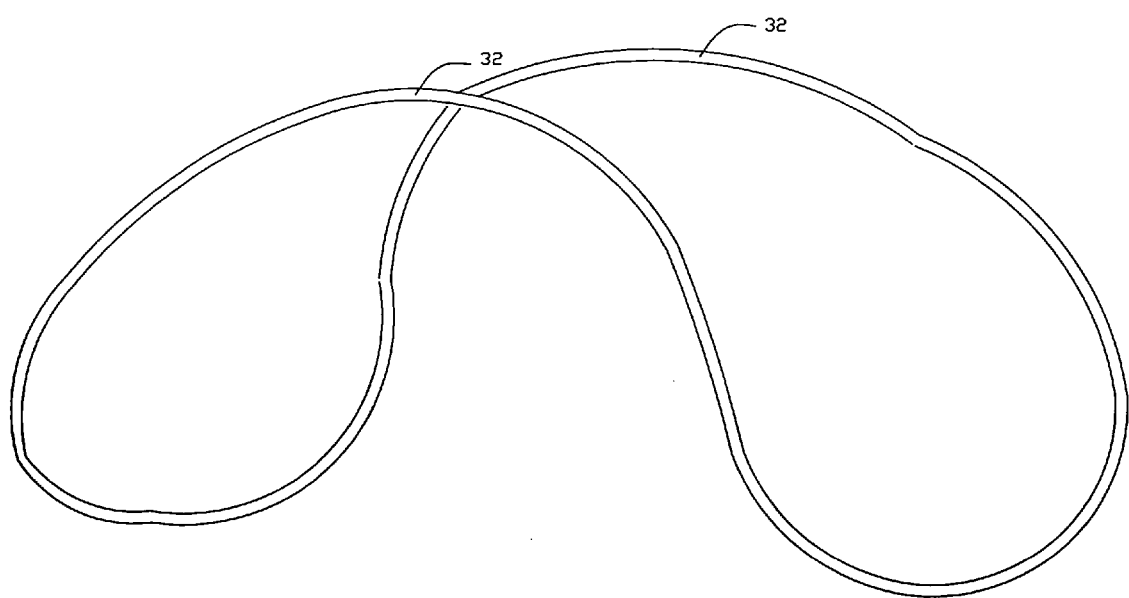
Figure 12B:
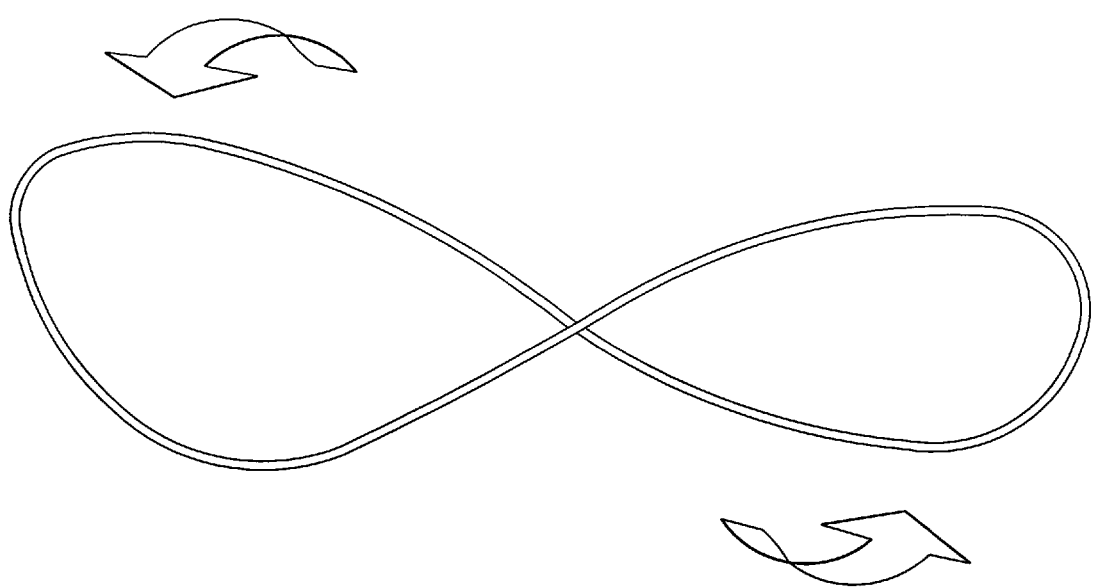
Figure 12C:
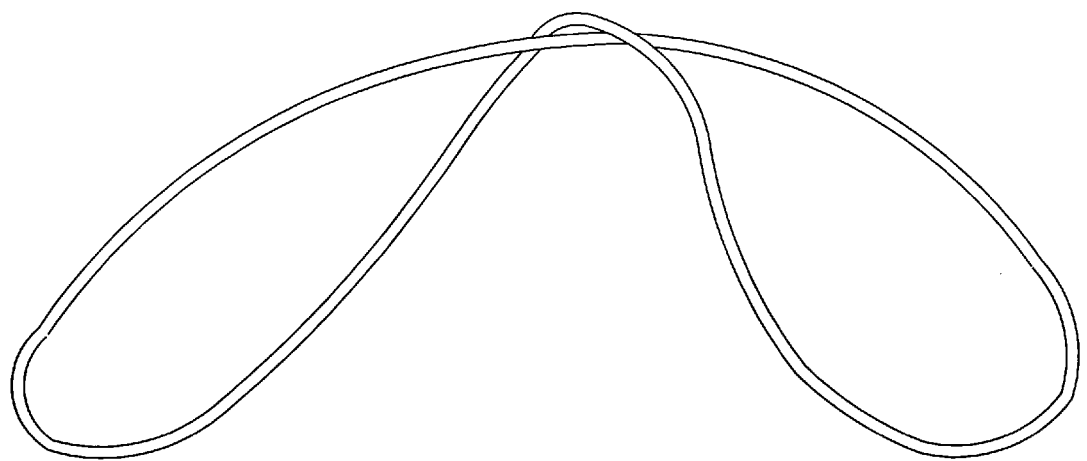
Figure 12D:
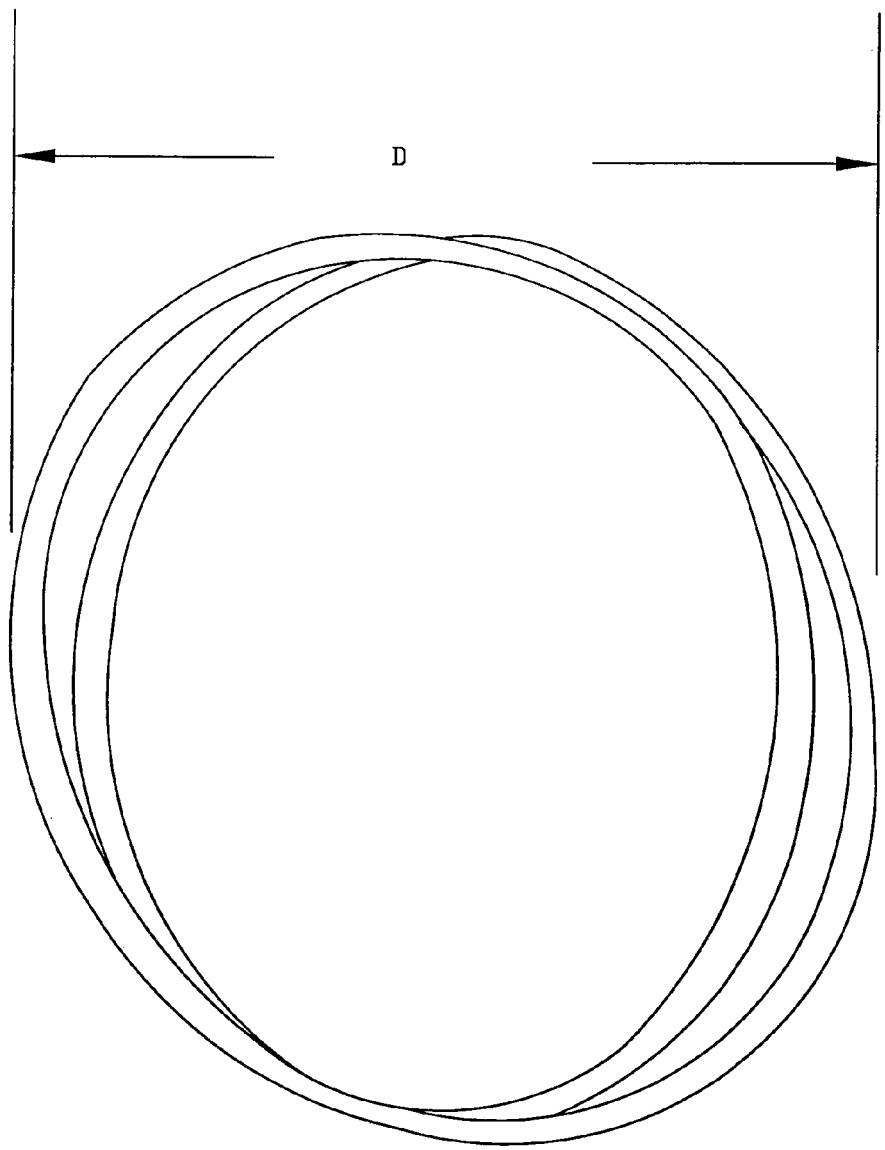
Figure 13:
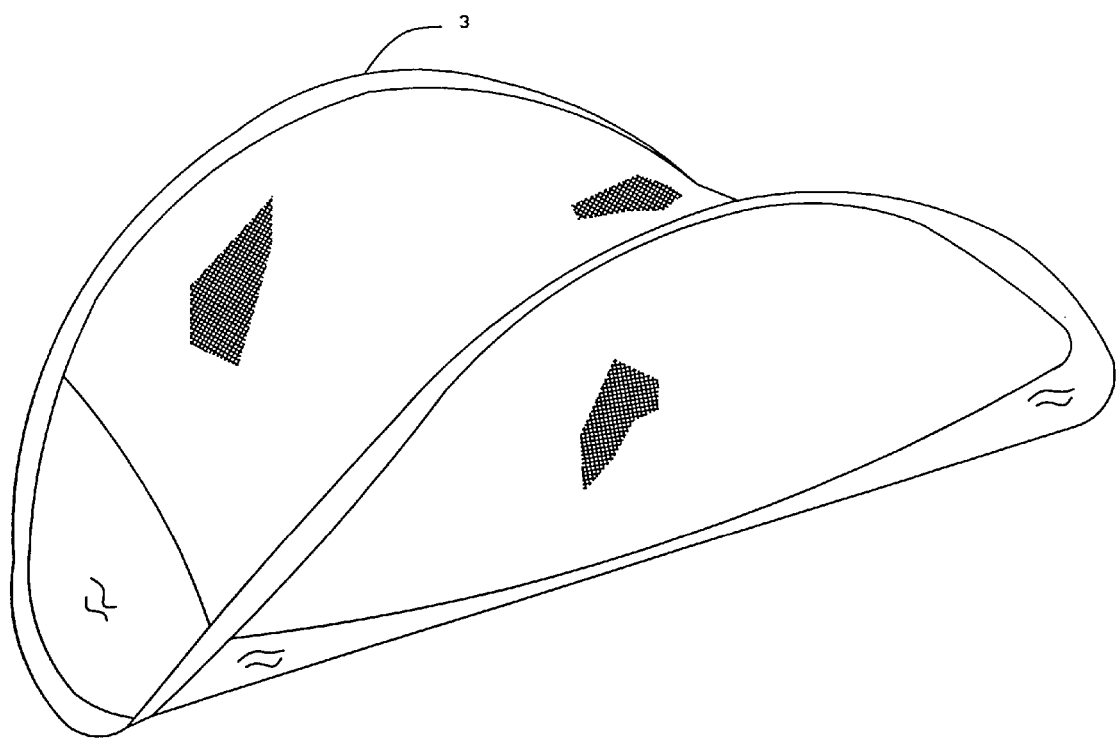

Due to the stored spring force of the frame member 3 portion of the cover in the coiled configuration per FIG. 11*c* or FIG. 12*d*, when released, the cover seeks its natural deployed configuration per FIG. 13, thereby self-erecting in a manner most convenient as fussing and untangling of the cover from its collapsed position is eliminated from the process of deploying the protective cover of the present invention.

Figure 14:
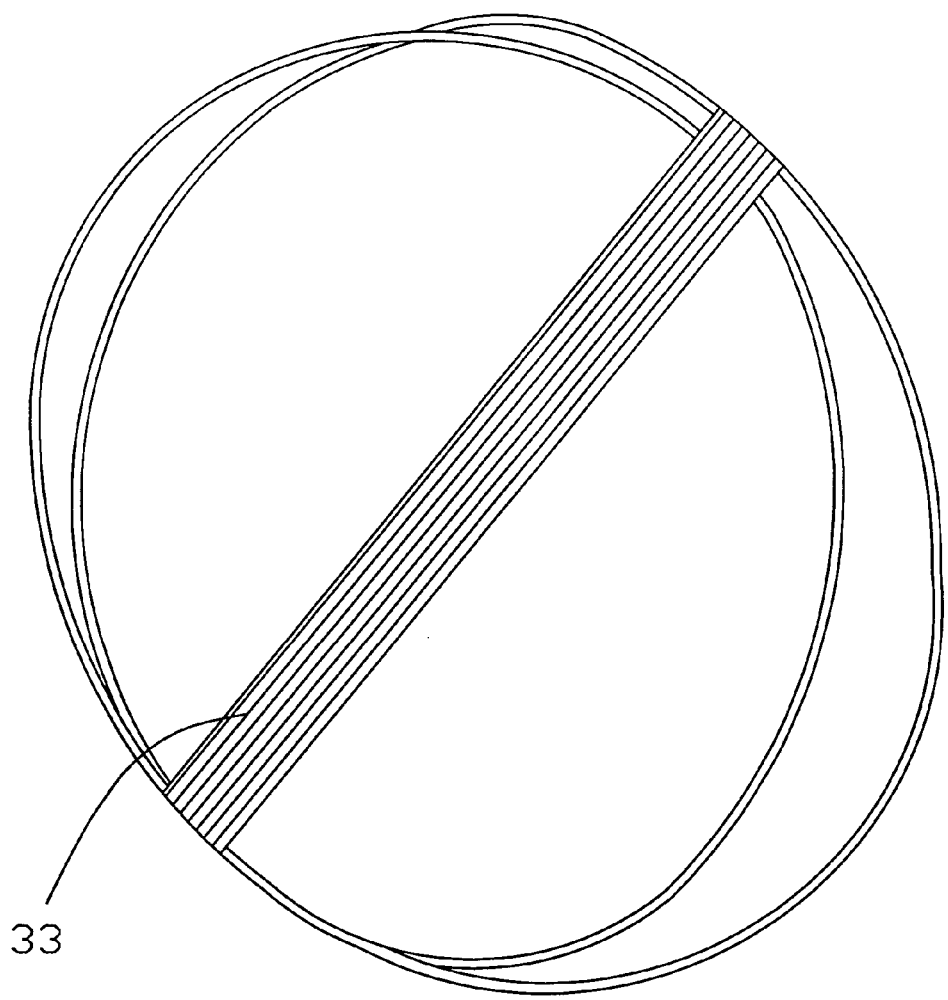
Figure 15:
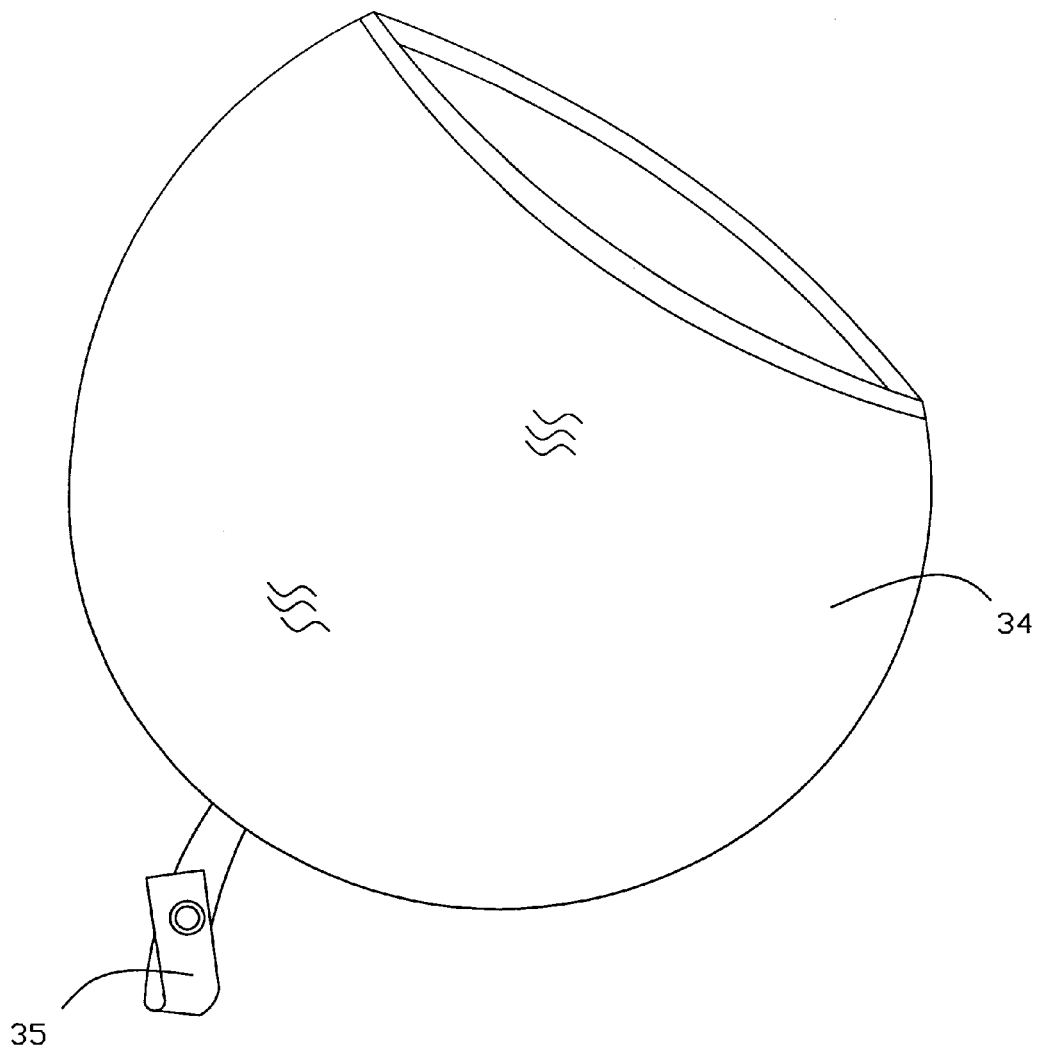
Figure 16:
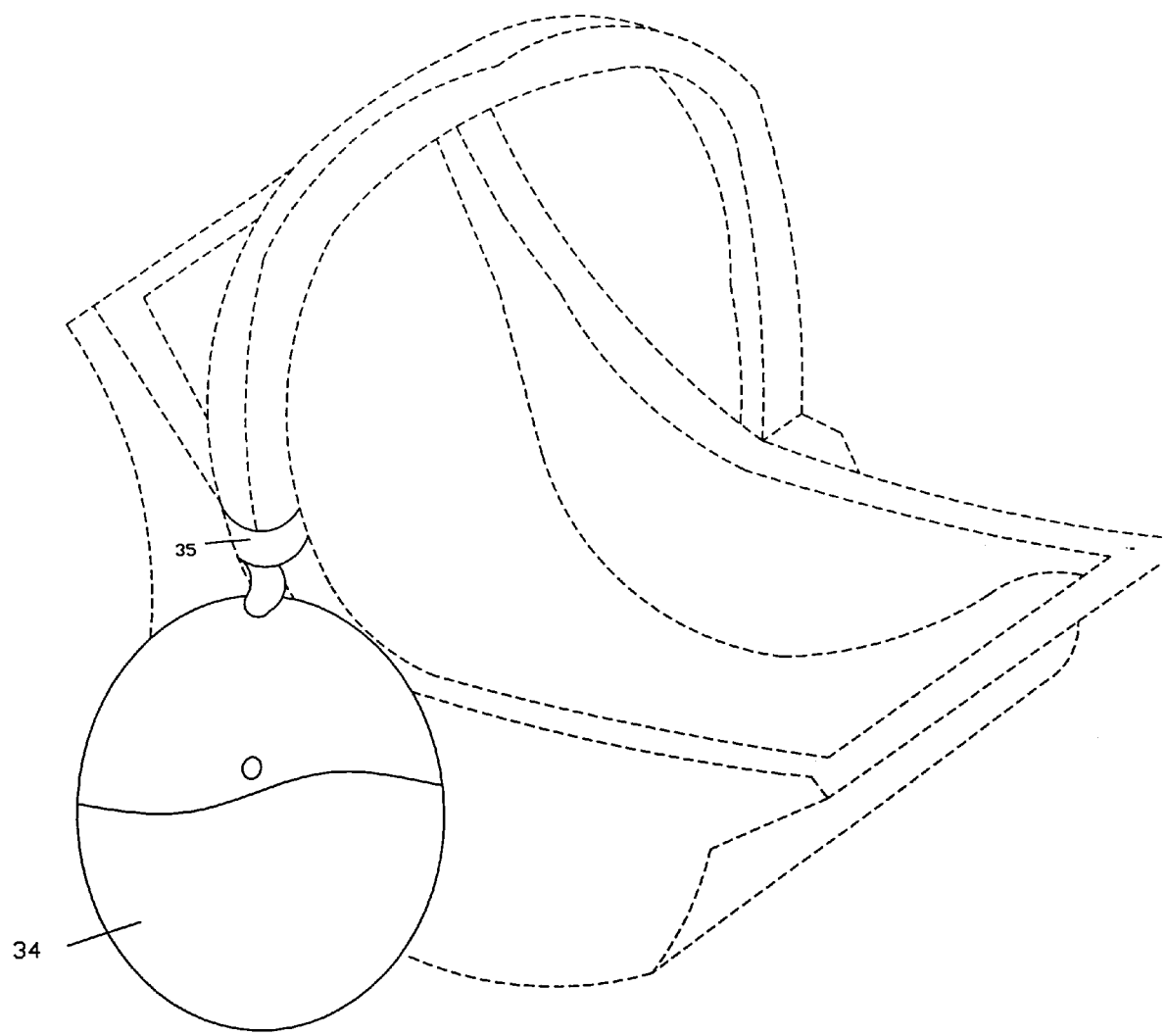

When in the coiled configuration depicted in FIG. 11*c* or FIG. 12*d*, the cover will tend to self-deploy into the deployed configuration per FIG. 13 under the spring force of the frame member 3 unless secured in the coiled configuration by means of an elasticized restraining element 33 depicted in FIG. 14. The restraining element 33 can alternatively be comprised of a hook and loop material, a strap that fastens by means of fasteners, or by a storage pocket 34 such as that depicted in FIG. 15 or other such means used by those familiar with the art. The restraining elements can be integrally attached to the assembly, or detachable and can be made of membrane such as fabric or leather, or synthetics. This storage pocket 34 can be equipped with a carrying strap or fastening strap 35 for convenient attachment and carrying as required as depicted on an infant seat in FIG. 16, and can be fastened likewise on other forms.

Figure 18:
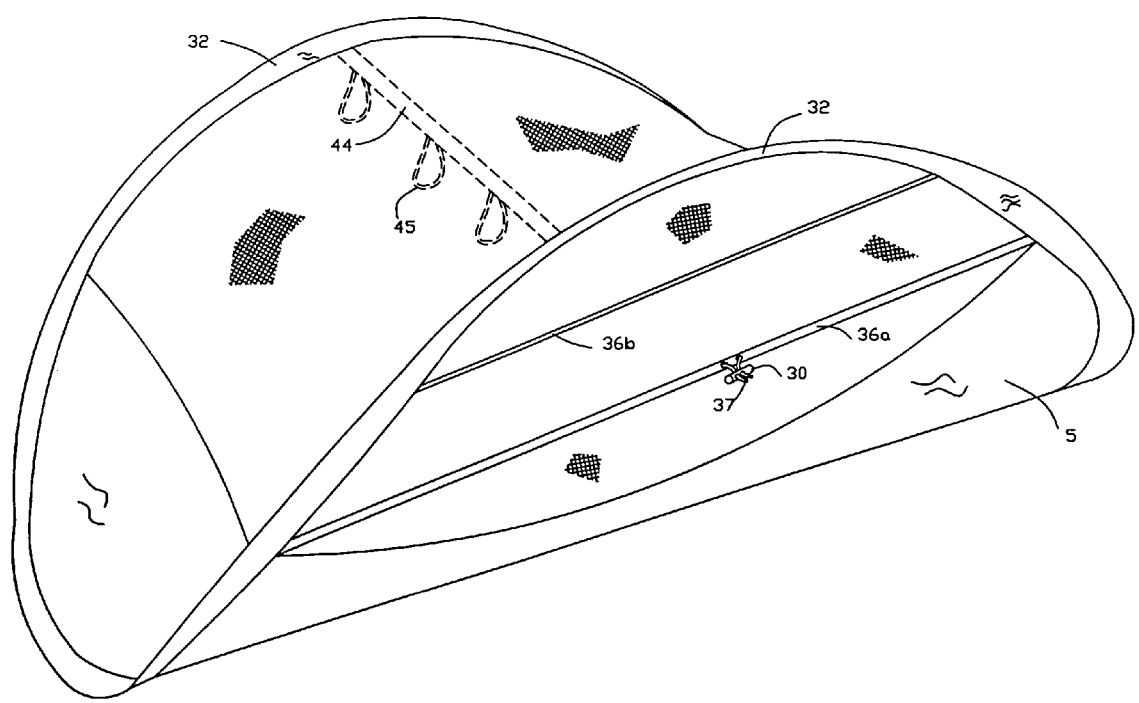

With the cover mounted on an infant seat per FIG. 18, the cover provides a natural canopy that keeps the ceiling membrane away from the face of the occupant due to a arched shape, which is maintained in this shape by the use of a pair of semi-circular like shaped side panel membranes 5 which includes reinforcements 36*a* and 36*b* to maintain the arched shape of the frame member 3. The reinforcements can be integrally sewn, woven, fused or encapsulated into the side panels at fixed length and therefore at a fixed ceiling height, or the membrane of the side panels 5 can be comprised of non-stretching material. Alternatively, in order to allow for increased arch shape, resulting in greater ceiling clearance from the occupant, the reinforcement 36*a* can be adjustable in length per FIG. 18 by means of a cord grip 30 and cord 37 or other such means known to those familiar with the art. Due to the elliptical shape of the ceiling panel, and the tendency for the frame member loop to seek its relaxed round loop geometry, the arched geometry will be unstable at the opposing length 32 quadrants where the minor axis of the ceiling panel ellipse shape intersects the frame member loop. This is because in the arched geometry the frame member loop is twisted out of its relaxed circular geometry, causing the loop to tend to twist in on its self to seek its relaxed loop geometry. Therefore, reinforcement 36*b* is employed, which effectively constrains the frame member loop from finding its relaxed position. Reinforcement 36*b* is particularly effective to prevent the arch from being lost during collapsing by preventing the frame member loop from turning itself inside out when the two opposing lengths are pushed together.

Figure 17:
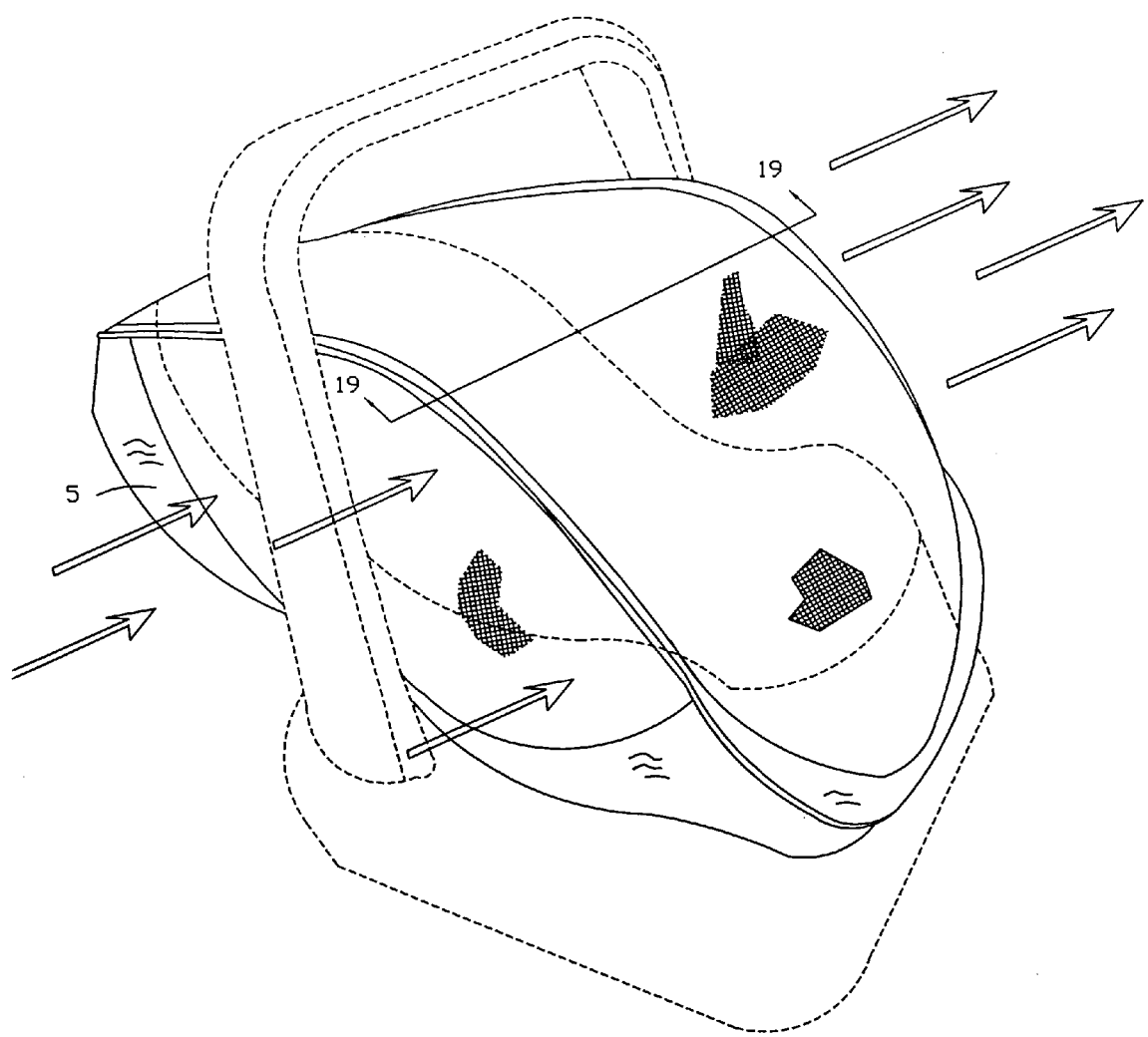

The semi-circular shape of the side panel membranes 5 provide elevated side vents that have broad cross sectional areas thereby creating large cross ventilation surfaces for viewing as shown by the arrows in FIG. 17 when the side panel membranes 5 are made of transparent ventilating materials such as mesh fabric, screen fabric, or perforated material which simultaneously affords visibility. Furthermore, it can be seen that the deployed arched shape provides a large internal space for the occupant, which, combined with the visibility afforded through the large side panels, thereby reduces the potential for feelings of confinement by the occupant. Another benefit is that the caregiver can view the occupant of the cover from both sides.

Figure 19:
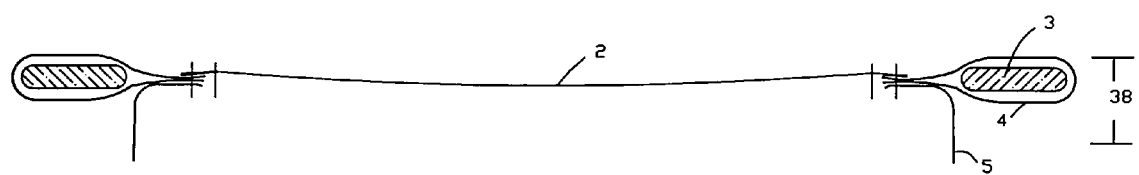
Figure 20:
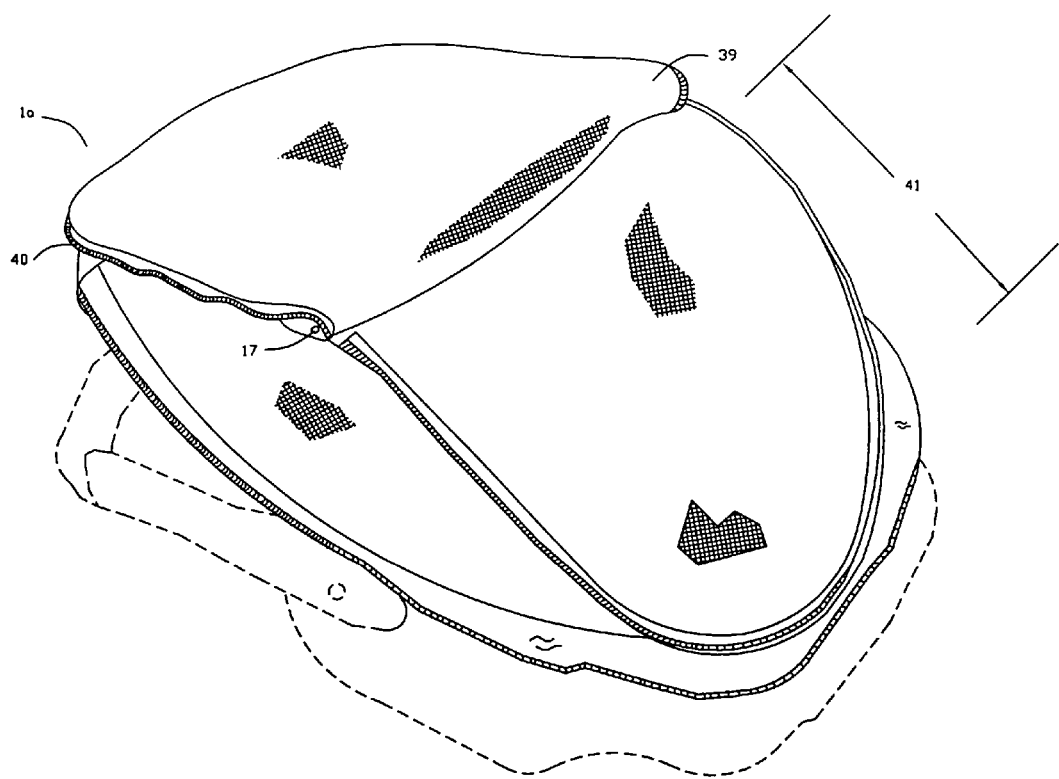

Another benefit of the arched rigid ceiling shape is that the perimeter of the ceiling which is defined by the frame member 3, the frame sleeve 4, the ceiling membrane 2, and the reinforced side panel membranes 5, creates a lip 38 per FIG. 19 which forms a rigid narrow perimeter around the ceiling membrane. The advantage of this lip 38 around the perimeter of the ceiling is its particular amenability to securely fastening easily mountable supplementary covers 39 that have elasticized perimeters 40 per FIG. 20, where the first embodiment is shown, although covers can be similarly employed on other embodiments. This lip 38, can not only be used to secure a cover which encapsulates the ceiling membrane 2, but can also be used to secure a portion of the cover out of the range of view 41 when the cover is fastened intermediately to the ceiling membrane 2 by means of snaps or buttons 17 with reference to FIG. 20.

In the preferred embodiment the ceiling membrane 2 and side panel membranes are comprised of one layer of mesh fabric, screen fabric, or perforated material, or a combination of fabrics that afford visibility and ventilation. As the ceiling membrane 2 allows air flow in a similar way that the side panel membranes 5 allow air flow, the environment protection afforded by the ceiling membrane and side panels relates to protecting the occupant from insects, UV radiation, aerosol germs, contact by strangers and limited wind resistance. Another benefit to the use of ceiling and side panel membrane material that affords visibility and ventilation in the preferred embodiment is the effect of reducing the probability of feelings of confinement to the occupant. Yet another benefit of visibility is that the caregiver can view the occupant from all top and side angles.

In the first embodiment insects are significantly discouraged from entering the enclosure due to the skirt perimeter 7 that seals around seat. the second and third embodiments, although discouraging insects by significantly encapsulating the occupant, can have enhanced insect protection with the addition of a wrap under insect netting, which completely encapsulates the occupant for environments where biting insects are a concern. The insect netting can be detachable by means of zipper, Velcro, snaps or other such method as is known to those familiar with the art. The insect netting can be comprised of a perforated material, or a combination of materials, or be impregnated with safe insect repellent elements, which prevent or further discourages insects from entering or approaching the protective cover.

In the preferred embodiments, the ceiling and side panel membranes have a UV protective quality, in a similar manner in which a perforated shade cloth would provide UV protection. This can be achieved by various methods including the use of light absorbent colors, light reflective materials, composite materials, polarizing materials and the like.

In the preferred embodiments the supplementary covers 39 will afford additional environmental protection against rain, direct sunlight, strong wind, air pollution and cold. For example, a supplementary cover to protect against rain can be comprised of transparent rain blocking material such as PVC, Mylar™, or a combination of materials to achieve similar effects. A supplementary cover to provide additional protection from UV radiation can be comprised of polarized fabric, shade cloth and the like. In another example a supplementary cover to provide protection from cold weather can be comprised of insulating material or heat reflective membrane, or fabrics such as Thinsulate™. In yet another example a supplemental cover designed to prevent the ingress of pollution can include filtration such as fabric encapsulates or is impregnated with activated carbon and the like.

Figure 21:
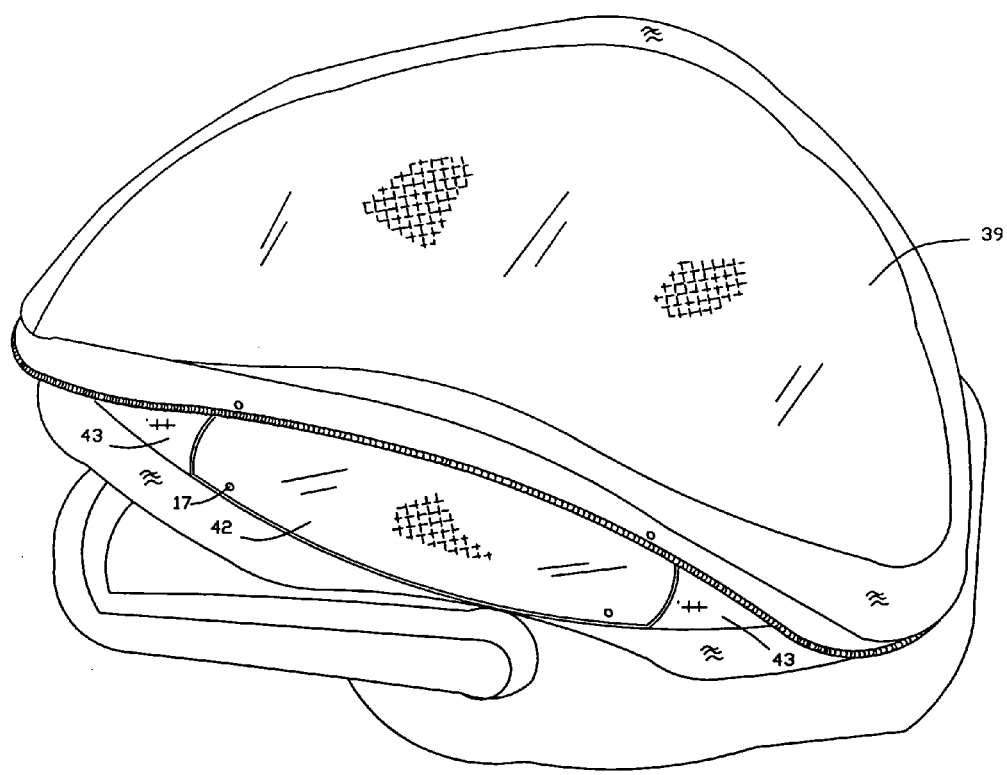

In one embodiment FIG. 21 depicts a supplementary cover 39, which employs side panel flaps 42 to afford additional side panel protection from extreme environmental influences, whilst affording ventilation by inherent perforations, or by under sizing the flap to allow gaps 43 in the side panel membrane of sufficient size for air to pass through. Snaps 17 are indicated to enable the side panel flaps 42 to be detachable.

As fabric technologies advance, the need for supplementary covers may diminish and the ceiling membrane 2 and side panel membranes 5 may be comprised of material or layering of composite material such that the final result, when used in conjunction with the frame geometry disclosed herein provides simultaneously protection from environmental effects whilst affording proper ventilation and visibility. Such materials are emerging in the market place.

FIG. 18 depicts an activity strap 44 with removable loops of strapping 45 to which various soft toys or light weight objects, or even a soother or bottle can be fastened by independent means so as to entertain the infant or to secure favored objects within arms length of the infant. Furthermore, the ceiling can be decorated with photo luminescent shapes such as stars, or pictures and the like for the entertainment of the occupant. These features are equally applicable to carriage applications.

The preferred embodiment of this invention is comprised of a base unit that may have one or more supplemental cover membranes. The base unit is covered with a single layer of ceiling membrane and a single layer of opposing side panel membranes such that these layers are comprised of a mesh fabric, perforated fabric, screen or the like, which affords ventilation and which is transparent enough to afford an adequate view from within and without. This enables viewing of the infant from all angles, panoramic view from within and ventilation from all sides. In short the membrane fabric may have transparency, ventilation properties, insect repellent properties, particulate filter properties, and shading properties. Breathable fabrics may also afford additional rain repellent properties. These types of fabrics may be conjoined fabrics, materials, or composites formed in various ways to afford application specific protective functionality.

As discussed, the base unit may be supplemented with easily mountable covers, which enhance and extend the range of possible applications, and may be comprised similarly of conjoined fabrics, materials, or composites formed in various ways to afford application specific protective functionality.

While the preferred embodiments of the present invention have been described, it should be understood that various changes, adaptations and modifications might be made thereto without departing from the spirit of the invention and the scope of the appended claims. It should be understood, therefore, that the invention is not to be limited to minor details of the illustrated invention shown in the figures and that variations in such minor details will be apparent to one skilled in the art.

Therefore it is to be understood that the present disclosure and embodiment of this invention described herein are for the purposes of illustration and example and that modifications and improvements may be made thereto without departing from the spirit of the invention or form the scope of the claims. The claims, therefore, are to be accorded a range of equivalents commensurate in scope with the advances made over the art.

The invention claimed is:

1. A collapsible cover for protecting an occupant in a seating unit having a head region and a foot region, the cover comprising:
    a body comprised of a flexible material having a top portion and at least one side wall portion, the top portion having a generally ellipse shape and having a length to span the distance between the head region and foot region of the seating unit and a width to span the width of the seating unit;
    the sidewall portion comprising a pair of generally semi circular side panel membranes to either side of the top portion connected to the top portion along a substantial portion of the periphery of the top portion to provide an arched configuration to the top portion;
    a closed loop frame member of a flexible coil-able material, being movable between an extended orientation to allow the cover to be attached to the seating unit and a collapsed orientation to allow for a reduced size of the cover for transport and storage the dosed loop frame member being connected to the periphery of the top portion to provide in the extended orientation an arched ellipse shape about the length of the top portion; and
    a skirt attached to the side panel membranes such that the skirt allows for releasable attachment of the cover to the seating unit.

2. A collapsible cover for a seating unit according to claim 1 including a restraining element to retain the collapsed cover in its reduced-size coiled state.

3. A collapsible cover for a seating unit according to claim 1 wherein the top portion is provided with a closure to allow the top portion to be opened and closed such that an occupant can enter and leave the seating unit without removing the collapsible cover.

4. A collapsible cover for seating unit according to claim 1 such that the skirt allows for releasable attachment of the cover to the seating unit by means of a draw string.

5. A collapsible cover for a seating unit according to claim 1, wherein a stiffening means is provided to span the distance between the frame member and the seating unit to aid in stably fastening and spacing the top portion above the seating unit.

6. A collapsible cover far a seating unit according to claim 1 including a frame sleeve provided along the periphery of the top portion for holding the closed loop frame member.

7. A collapsible cover for a seating unit according to claim 1 wherein a substantial amount of the material of the top portion allows passage of air, but blocks insects.

8. A collapsible cover for a seating unit according to claim 1 wherein a substantial amount of the material of the sidewall portion allows passage of air, but blocks insects.

9. A collapsible cover for a seating unit according to claim 1 that self-erects into the extended orientation from the collapsed orientation.

10. A collapsible cover for a seating unit according to claim 1 including at least one layer of supplemental cover material of a size and shape similar to the top portion that can be attached to said top portion to provide an additional layer of protection from weather conditions to an occupant of the seating unit.

11. A collapsible cover for a seating unit according to claim 1 wherein the frame member is constructed of a material selected from the group consisting of spring steel, synthetic polymer material, metal alloy, and composite material.

12. A collapsible cover for a seating unit according to claim 1 wherein the frame member is constructed of a material selected from the group consisting of flat cross section spring steel wire, flat cross section synthetic polymer material, flat cross section metal alloy and flat cross section composite material that is treated so as to resist corrosion.

13. A collapsible cover for a seating unit according to claim 12 having pre-coil geometry that in the extended orientation permits rapid movement into the collapsed orientation without the requirement to twist the cover.

* * * * *

(12) EX PARTE REEXAMINATION CERTIFICATE (9192nd)
United States Patent
McGregor

(10) Number: US 7,150,499 C1
(45) Certificate Issued: Aug. 14, 2012

(54) COLLAPSIBLE COVER FOR SEATING UNIT

(75) Inventor: Rob Roy McGregor, Toronto (CA)

(73) Assignee: 6134548 Canada Inc., Toronto, Ontario (CA)

Reexamination Request:
No. 90/012,030, Dec. 1, 2011

Reexamination Certificate for:
Patent No.: 7,150,499
Issued: Dec. 19, 2006
Appl. No.: 11/152,152
Filed: Jun. 15, 2005

Related U.S. Application Data

(60) Provisional application No. 60/579,260, filed on Jun. 15, 2004.

(51) Int. Cl.
*A47C 7/62* (2006.01)

(52) U.S. Cl. ............................. 297/184.13; 297/184.15
(58) Field of Classification Search ........................ None
See application file for complete search history.

(56) References Cited

To view the complete listing of prior art documents cited during the proceeding for Reexamination Control Number 90/012,030, please refer to the USPTO's public Patent Application Information Retrieval (PAIR) system under the Display References tab.

*Primary Examiner* — Peter C. English

(57) ABSTRACT

The present invention is directed to a collapsible cover for protecting an occupant in a seating unit having a head region and a foot region. The cover has a body comprised of a flexible material having a top portion and at least one side wall portion, the top portion having a generally ellipse shape and having a length to span the distance between the head region and foot region of the seating unit and a width to span the width of the seating unit. The sidewall portion is connected to the top portion along a substantial portion of the periphery of the top portion to provide an arched configuration to the top portion. The cover further has a single closed loop frame member made of a flexible, coilable, resilient material, that is secured along the length of the structure's membrane body so as to assume an ellipse-like shape when viewed from above, that is bent into an arched configuration about its minor axis. The closed loop frame member is movable between an extended orientation to allow the cover to be attached to the seating unit and a collapsed orientation to allow for a reduced size of the cover for transport and storage and is connected to the periphery of the top portion to provide in the extended orientation an arched ellipse shape about the length of the top portion. The cover also has a means for releasably attaching the cover to a seating unit.

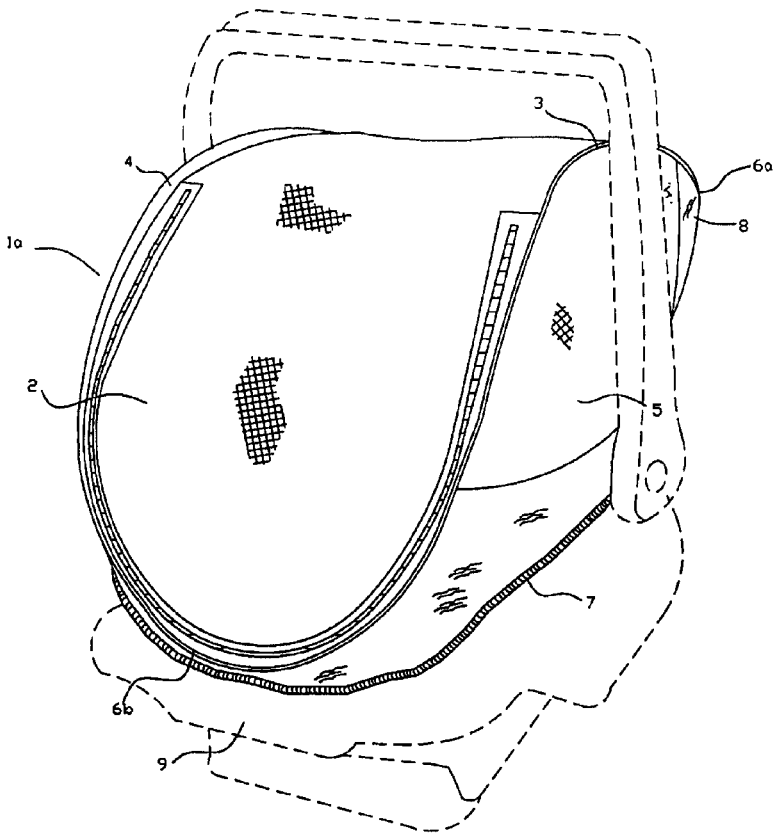

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4 and 6-13 are cancelled.
Claim 5 was not reexamined.

\* \* \* \* \*